US005129503A

United States Patent [19]

Belec et al.

[11] Patent Number: 5,129,503

[45] Date of Patent: Jul. 14, 1992

[54] TURNOVER MODULE

[75] Inventors: Eric A. Belec, Kempton, Pa.; James S. Lee, Jr., Phillipsburg, N.J.; Harry C. Noll, Jr., Whitehall, Pa.; David P. Nyffenegger, Bethlehem, Pa.; Winston A. Orsinger, Nazareth, Pa.; Richard B. Hawkes, Bethlehem, Pa.; George Fallos, Easton, Pa.

[73] Assignee: Bell & Howell Company, Skokie, Ill.

[21] Appl. No.: 703,856

[22] Filed: May 21, 1991

Related U.S. Application Data

[62] Division of Ser. No. 338,171, Apr. 14, 1989, Pat. No. 5,029,832.

[51] Int. Cl.[5] .................... B65G 47/24

[52] U.S. Cl. .................... 198/405; 198/417; 198/605

[58] Field of Search .................... 198/404, 405, 417, 605

[56] References Cited

U.S. PATENT DOCUMENTS

| | | | |
|---|---|---|---|
| 2,621,039 | 12/1952 | Kleinberg . | |
| 2,947,406 | 8/1960 | Hazelton, Jr. | 198/405 |
| 3,423,900 | 1/1969 | Orsinger . | |
| 3,593,486 | 7/1971 | Helm . | |
| 3,606,951 | 9/1971 | Sather et al. . | |
| 3,729,189 | 4/1973 | Watson | 198/405 X |
| 3,767,028 | 10/1973 | Rosso | 198/405 |
| 3,825,247 | 7/1974 | Fernandez-Rana et al. . | |
| 3,911,862 | 10/1975 | Lupkas . | |
| 4,043,551 | 8/1977 | Morrison et al. . | |
| 4,079,576 | 3/1978 | Morrison et al. . | |
| 4,177,979 | 12/1979 | Orsinger et al. . | |
| 4,226,324 | 10/1980 | Stocker | 198/405 |
| 4,479,574 | 10/1984 | Julius et al. | 198/405 X |
| 4,569,620 | 2/1986 | Lynch | 198/405 X |
| 4,576,370 | 3/1986 | Jackson . | |
| 4,582,312 | 4/1986 | Abrams . | |
| 4,639,873 | 1/1981 | Baggarly . | |
| 4,649,691 | 3/1987 | Buckholz . | |
| 4,734,865 | 3/1988 | Scullion . | |
| 4,741,147 | 3/1988 | Noll . | |
| 4,798,040 | 1/1989 | Haas et al. . | |

FOREIGN PATENT DOCUMENTS

| | | | |
|---|---|---|---|
| 0102700 | 3/1984 | European Pat. Off. . | |
| 1234629 | 2/1967 | Fed. Rep. of Germany | 198/405 |
| 2543491 | 3/1984 | France . | |
| 818684 | 8/1959 | United Kingdom | 198/405 |
| 1237873 | 6/1971 | United Kingdom . | |
| 1567603 | 5/1980 | United Kingdom . | |

*Primary Examiner*—D. Glenn Dayoan
*Attorney, Agent, or Firm*—Griffin, Branigan & Butler

[57] ABSTRACT

A turnover module for turning over envelopes comprises a plurality of pulleys and disposed thereabout a driven endless belt in the general shape of a flattened figure '8'. The belt includes a crossover region and a first and a second reach extending therethrough. The reaches contact one another resiliently along length portions thereof while crossing over and twisting about one another. Envelopes are received in a first orientation at an entry end of the reaches; nipped between the reaches; transported thereby through the crossover region while being turned over by virtue of the twist of the reaches about one another; and, delivered from the turnover module in a second orientation.

15 Claims, 14 Drawing Sheets

TURNOVER MODULE

This is a division of application Ser. No. 07/338,171, filed Apr. 14, 1989, now U.S. Pat. No. 5,029,832,

BACKGROUND OF THE INVENTION

1. Field of the Invention

This invention relates to apparatus and method for handling high volume business mail and, in particular, it relates to in-line rotary inserter device having a plurality of hopper-held insert feeding assemblies positioned along conveyors for dispensing of inserts onto the conveyors, and having devices for stuffing envelopes with the inserts.

2. Prior Art and Other Considerations

Many present mechanical devices for stuffing inserts into envelopes employ conveyors for conveying stack-dispensed inserts to an envelope stuffing device. Multiple inserter devices rely on a plurality of hoppers which are disposed along conveyors and which dispense inserts onto the conveyor in predetermined manner to result in collated packages of inserts that are subsequently inserted into envelopes.

Increasingly widespread need in commerical and governmental institutions is found for envelope inserting equipment that is capable of operating at higher celerities with high reliabilities and short down-times. Problems associated with high-speed operation of such equipment are generally of a kind that do not exist or are inconsequential in lower speed operation. Such problems, for instance, relate to high accelerations and decelerations of mechanical components and inserts and envelopes, together with frictional, inertial, and other effects affecting moving equipment components and handled document materials.

Moreover, demands on accuracy of document material positioning and alignment in the course of its handling is greatly increasing in high speed operation.

Additionally, equipment down-time takes on a whole new meaning when high speed operation is involved. Even a short down-time represents loss of significant proportions of production runs and requires costly skilled operator action in order to remedy the cause, as well as to reset preprogrammed operation to obtain the required production.

The complexity of control and supervision of selectively utilizable operations and functions for high speed in-line inserters and the associated need for automatically sensing and acting upon a plurality of critical operating parameters and fault conditions, and other considerations particularly related to efficient high-speed operation have hitherto impeded technical progress toward achievement of satisfactory performance under high volume and high celerity conditions.

Prior art inserter devices include U.S. Pat. No. 4,043,551 and 4,079,576 to Morrison et al, U.S. Pat. No. 4,177,979 to Orsinger et al, U.S. Pat. No. 4,649,691 to Buckholz, U.S. Pat. No. 3,825,247 to Fernadez-Rana et al, U.S. Pat. No. 3,423,900 to Orsinger, U.S. Pat. No. 2,621,039 to Kleineberg et al, and U.S. Pat. No. 3,809,385 to Rana.

In view of the foregoing, it is an object of the present invention to provide apparatus and method for automatically inserting into envelopes at high celerities a plurality of inserts in predetermined and preprogrammed continuous manner and to further automatically process such insert-filled envelopes through diverting, flap-sealing, turn-over, stacking, and other operations associated therewith, all under computer control and supervision and to provide higher production rates than heretofore practically feasible.

SUMMARY OF THE INVENTION

U.S. Pat. No. 4,177,979 (Orsinger et al), entitled "Signature Gathering Machine", and commonly assigned herewith, is incorporated herein by reference.

In accordance with principles of the present invention, envelopes are conveyed from a hopper to an inserting station, where they are opened and inserts are inserted therein. The inserts are funished by a plurality of modular insert hoppers which are positioned in line above an endless insert conveyor of the pusher pin type. Envelopes having inserts inserted therein are transported to a vacuum-belt transporter/diverter unit and are directed and transported thereby along at least one path. The vacuum belt transporter/diverter unit comprises a vacuum belt driver for selective diversion and transport of inserted envelopes to at least one of two paths, at least one of which paths including a sealing module, a turnover module, and an on-edge stacking unit.

The entire inserter apparatus operates under computer control and supervision that is preprogrammable. Automatic error handling and visual display of operational status and program information are provided. The main inserter apparatus operates substantially in continuous synchronous mode.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

DESCRIPTION OF THE PREFERRED EMBODIMENTS

Figure 1:
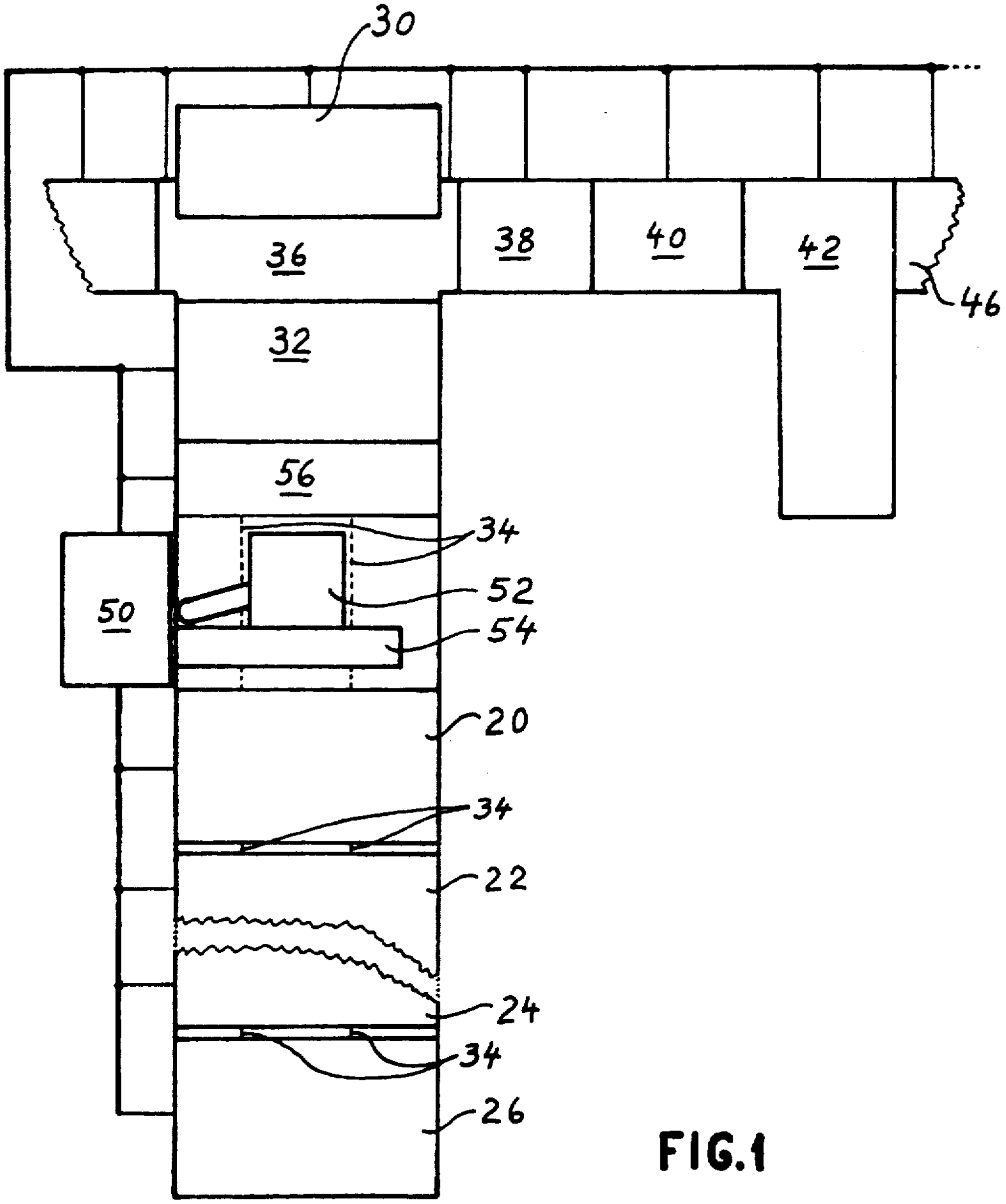
FIG. 1 is a schematic diagrammatic plan view of a preferred embodiment of an in-line rotary inserter according to present invention.

An in-line rotary inserter apparatus is shown diagrammatically in FIG. 1 and comprises basically the following subsystems:

One or more rotary insert feeder modules 20, 22, 24, 26, for furnishing inserts from insert hoppers, each including an insert thickness detector;

an envelope feed station 30 for funishing envelopes from an envelope hopper;

an inserting station 32 in which envelopes are inserted with inserts that are collated and conveyed thereto upon a pin conveyor 34 (from insert feeder modules);

a vacuum belt transporter/diverter unit 36 for transport and selective diversion of inserted envelopes to at least one path, the vacuum belt transporter/diverter unit 36 providing selective diversion and transport to one of two paths, whereby at least one path comprises an envelope sealing module 38 that seals enevlope flaps and that transports envelopes farther, and whereby the other one of said two paths may alternately serve to receive incompletely inserted (faulty) envelopes due to stuck envelopes, buckled envelopes, and the like;

a turnover module 40 that receives sealed envelopes from an envelope sealing module 38, turns them flap-side down, and further transports them; and an on-edge stacking-diverter unit 42 (that also comprises an accumulator 44) that receives envelopes from turnover module 40 and selectively diverts envelopes and stacks them on edge in accumulator 44 or passes envelopes on to be further conveyed to additional handling equipment 46.

The in-line rotary inserter apparatus shown in FIG. 1 further comprises a main computer 50 for operational control, supervision, and coordination of individual units and modules interconnected therewith, a display/-control console 52 to display operational information and recieve operator input commands, a skew detector arrangement 54 for sensing of misalignments of collated inserts being conveyed to inserting station 32, and an insert diverter 56 for diversion of inserts (for instance in case of errors in, damage to, or misalignments of inserts). Not specifically shown in FIG. 1 is an envelope diverter 33 (FIG. 2) which is provided in a location between envelope feed station 30 and inserting station 32 and which is disposed in a lower equipment region (below pin conveyor 34) along the envelope feed path for selective interception of envelopes that have been stigmatized as being faulty. As specific inserts are intended to be inserted into specific envelopes (and are associated therewith), selective diversion of inserts by insert diverter 56 in case of the occurence of insert fault conditions is associated with interception and diversion of corresponding envelopes in envelope diverter 33 and vice versa. Thusly, if either inserts or associated envelopes are stigmatized as faulty or otherwise desired to be diverted, the corresponding associated envelopes or inserts, respectively, are also diverted in order to avoid empty envelopes or inserts without envelopes being handled and transported farther. Therefore, envelope diverter 33 also serves to selectively divert (under preprogrammed control of computer 50) those envelopes for whom intended associated inserts have been diverted by insert diverter 56.

Overall operation of in-line inserter apparatus is described in U.S. Pat. No. 4,079,576 to Wilbur J. Morrisson et al., commonly assigned herewith, and the respective material in that patent is hereby incorporated by reference herein.

Figure 2:
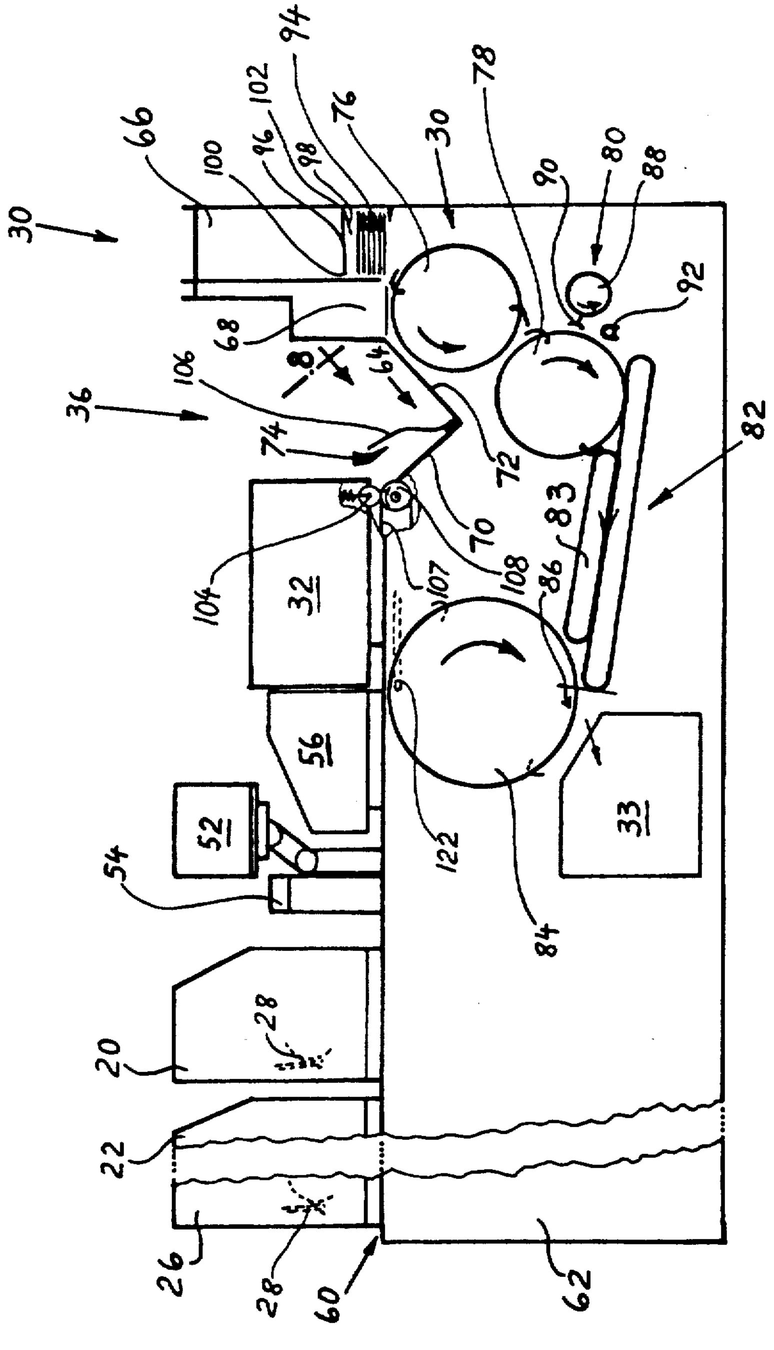
FIG. 2 is a schematic fragmental side elevational view of a main portion of the in-line rotary inserter apparatus (shown in FIG. 1) including a partial schematic side view of an envelope feed path mechanism.

Referring now also to FIG. 2, a main track bed 60 is horizontally disposed in the upper portion of a main base 62. Main track bed 60 carries, in its upper portion, pin conveyor 34 for receiving (in collated manner) inserts from insert feeder modules 20, 22, and 26, and for transporting (from left to right) such insert past skew detector arrangement 54 and insert diverter 56 to inserting station 32. Display/control console 52 is shown adjustable mounted above main track bed 60. Insert feeder modules (20, 22, 26), skew detector 54, insert diverter 56, and inserting station 32 are generally disposed above main track bed 60 in cantilevered bridging manner.

Envelope feed station 30 is disposed on and within main base 62 at the end thereof that is opposite to the end that carries insert feeder modules. The upper portion of envelope feed station 30 includes an envelope hopper 66 and a hopper mechanism 68. A transverse pass 64, having first and second sloping walls 70 and 72, is disposed in upper portion of main base 62 between inserting station 32 and hopper mechanism 68. A fall region 74 is disposed above and upon first sloping wall 70. Envelope feed station 30 comprises envelope hopper 66, hopper mechanism 68 for withdrawing of envelopes from hopper 66 and for feeding of envelopes to a first gripper drum 76, a second gripper drum 78 for transporting envelopes conveyed thereto by first gripper drum 76, a flap opener 80 to open envelope flaps of envelopes transported by second gripper drum 78, and an envelope conveyor device 82, including an adjustable upper belt device 83, for conveying of envelopes from second gripper drum 78 to a vacuum gripper drum 84. Gripper drums 76 and 78 (and their operation) are of generally conventional kind. Envelope diverter 33 is disposed proximate to the delivery end of envelope conveyor device 82 to selectively intercept and divert envelope rejects into a reject catch bin. Vacuum gripper drum 84 delivers envelopes onto main track bed 60 in readiness for inserting with inserts in inserting station 32.

Flap opener 80 comprises a rotating rotor 88, having a rotary valve arrangement associated therewith for valving of vacuum to one or more sucker cups 90. Sucker cup 90 is disposed upon the periphery of rotor 88, whose rotation (and valving of vacuum to sucker cup 90) is synchronized and properly phase with the rotation of second gripper drum 76 so that the flap of an envelope transported by second gripper drum 76 past flap opener 80 is momentarily grabbed and opened (unfolded) by sucker cup 90. A plow/sensor device 92, that is disposed just downstream from flap opener 80 intercepts an opened flap and further bends it into the unfolded position as the envelope is transported by and upon second gripper drum 78. Plow/sensor device 92 is equipped with a photo-sensor to check correct flap opening and to detect if an envelope is missing at the time when it should be present.

Envelope hopper 66 contains an envelope stack 94. Envelopes are stacked therein in an orientation as indicated by a typical stacked envelope 96 having a leading edge 100, a trailing edge 102, and an envelope flap 98 folded along trailing edge 102 onto its lower face. Consequently, withdrawal of an envelope from the bottom of envelope stack 94 onto first gripper drum 76 is performed in an attitude and a direction that precludes catching of the flap of the next envelope. Transport of the withdrawn envelope by first gripper drum 76 to second gripper drum 78 results in an orientation of the envelope (upon second gripper drum 78), as it passes by flap opener 80, having unopened envelope flap 98 facing toward flap opener 80. At this time, sucker cup 90 grabs envelope flap 98 by vacuum action and hinges it about trailing edge 102 into an open position during passage of the envelope (held by and transported upon second gripper drum 78). Opened flap 98 is thereupon intercepted by plow/sensor device 92 and thereby further unfolded, whilst sucker cup 90 releases as its vacuum is vented and valved off in accordance with the operation of the rotary valving arrangement of rotor 88.

Subsequently, an envelope is delivered and released onto envelope conveyor device 82. Envelope conveyor device 82 comprises two driven endless belts that nip therebetween an envelope delivered thereto and convey it to vacuum gripper drum 84. A typical envelope will be continuously transported from envelope conveyor device 82 to vacuum gripper drum 84.

The two driven belts (comprised in conveyor device 82) are arranged in such a manner as to permit slippage of an envelope with respect to the belt motion when the leading edge of an envelope, that is to be diverted, is stopped by a selectively interposable stop gate 86. For the purpose of adjustment of this slippage, upper belt device 83 is adjustably mounted so that its position and orientation is manually adjustable (and lockable) to change the pressure in the nip against the lower belt, particularly in the vicinity of the delivery region to vaccum gripper drum 84. Such adjustment serves also to adapt operation of conveyor device 82 to handling of different envelope sizes, materials, etc. An envelope that is intended to be diverted, and that is transported by means of the envelope conveyor device 82, is inhibited from farther motion by interposition of stop gate 86 for a sufficient time so that it can no longer be gripped by the next corresponding grippers of vacuum gripper drum 84 that pass by. After such time, stop gate 86 is moved out of the way of the envelope path and the envelope will then be driven by the belts into a reject envelope bin located in envelope diverter 33.

In an alternate embodiment of the present invention, stop gate 86 is interposed into the path of each envelope conveyed by envelope conveyor device 82 so that each arriving envelope that is intended for further transportation by vacuum gripper drum 84 is thereby registered in proper position. Stop gate 86 is moved out of the way to release each envelope at the appropriate instant in time for gripping by the grippers of vacuum gripper drum 84 and for further transportation thereby. For envelopes that are to be rejected and diverted, interposed stop gate 86 is moved out of the way at a time when the envelope is free to be driven by the belts of envelope conveyor device 82 into a reject envelope bin located in envelope diverter 33 without being intercepted by grippers (that pass by) of vacuum gripper drum 84.

Envelopes delivered onto main track bed 60 are positioned by vacuum gripper drum 84 (as will be described hereinafter) for the inserting operation with inserts in inserting station 32. Inserted envelopes are delivered from inserting station 32 (from main track bed 60) through a nip between a spring-loaded pressure roller arrangement 104 and a driven conveyor belt arrangement 107 that rides about a pulley arrangement 108 into fall region 74 of transverse pass 64 in the same orientation as received, i.e. with leading edge 100 leading and envelope flap 98 trailing open (closeable over the top of envelope). A thusly delivered inserted envelope thereby falls from conveyor belt arrangement 107 (and pulley arrangemnt 108) into fall region 74 and is guided during the fall by a deflector bar 106 so that it settles, thereafter, against first sloping wall 70 of vacuum belt transporter/diverter unit 36 (FIG. 1).

Figure 3:
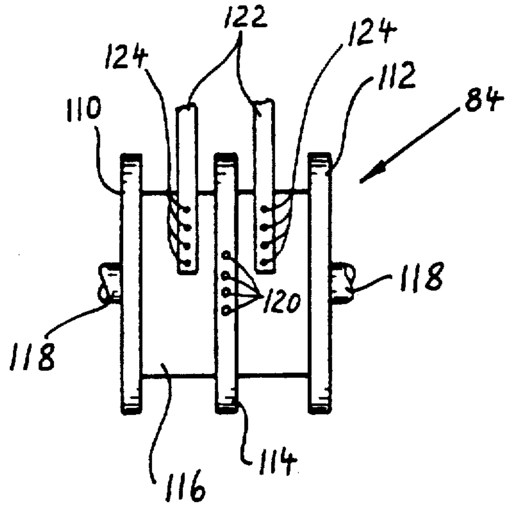
FIG. 3 is a schematic partial detail top view of a vacuum gripper drum of the envelope feed path mechanism (shown in FIG. 2)

Referring now to FIG. 3, continuously revolving vacuum gripper drum 84 schematically depicted therein comprises a first and a second face disc 110 and 112 mounted on a drum 116, which in turn is rotatably supported upon a drum axle 118 in accordance with conventional practise. Various mechanisms (not shown here) are included in this assembly in conventional manner to perform the required conventional gripper drum functions. In accordance with principles of the present invention, a vacuum disc 114 is further mounted on drum 116 between first and second face discs 110 and 112. Vacuum disc 114 is provided with a plurality of vacuum holes 120 that are connected via valving to a source of vacuum not shown here. Vacuum holes 120 are disposed about the periphery of vacuum disc 114 in a plurality of groups, whereby each group is disposed in predetermined relationship to the drum gripper mechanisms in a location where an envelope is to be carried, and vacuum is valved thereto automatically before an envelope is released by respective grippers on the gripper drum 84. Consequently, the envelope that is released by the grippers remains attached to vacuum gripper drum 84 upon vacuum holes 120 until it is delivered to its horizontal registered position on main track bed 60.

Partially depicted in FIG. 3 is a pair of stationary vacuum arms 122 disposed on either side of vacuum disc 114. Vacuum arms 122 are mounted in cantilevered manner within main track bed 60 (indicated in FIG. 2) such as to reach above drum 116 and having their upper surfaces horizontally disposed and substantially at the same level as the highest level of the periphery of vacuum disc 114. As an envelope is being delivered to its horizontal position on main track bed 60 and just subsequent to its release from grippers of vacuum gripper drum 84, the envelope is carried farther by the hereinabove described action of vacuum disc 114 and is, thereby, transported onto stationary vacuum arms 122 up to a mechanical stop (here not shown). Thereafter, vacuum holes 120 are disconnected from the source of vacuum (by automatic action of the indicated valving that disconnects and vents vacuum holes 120). A plurality of arm vacuum holes 124 disposed in the upper surface of vacuum arms 122, and connected via valving to a vaccum source, is now valved to connect to a vacuum source for the duration of the envelope inserting operation. As a consequence, the presently lower portion of the envelope is held down onto vacuum arms 122 in readiness for the inserting operation.

Figure 3A:
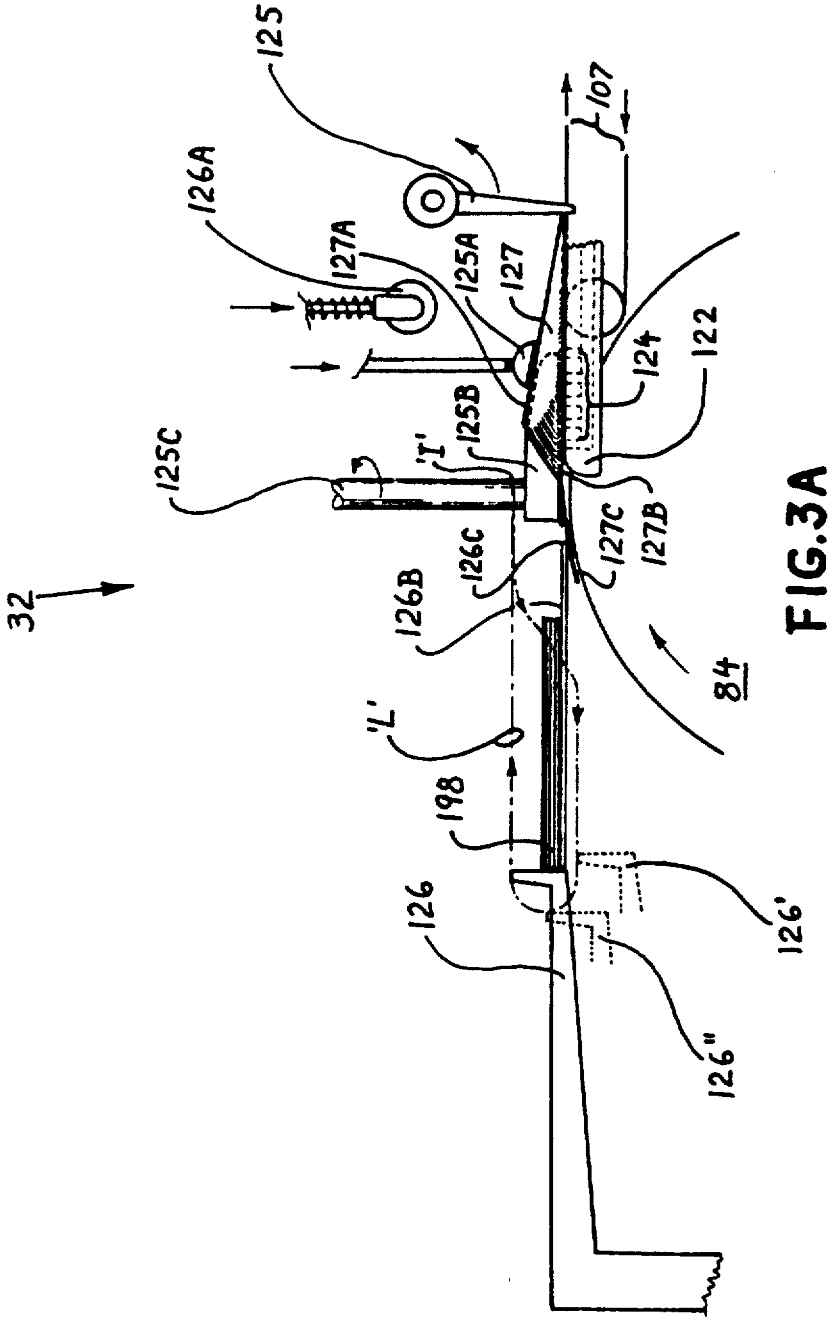
FIG. 3A is a schematic fragmental side elevational detail view of a portion of the inserter mechanism of the in-line rotary inserter apparatus shown in FIG. 2.

Referring now to FIG. 3A, a fragmented portion of the inserter mechanism of inserting station 32 (FIGS. 1 and 2) is shown therein. The various components are disposed in mutual positional relationships representative of an early stage of the inserting opertion. FIG. 3A depicts pertinent components disposed in the lower region of inserting station 32 including components specifically involved and associated with the inserting operation that are disposed on, in and below main track bed 60 (FIG. 2) in the vicinity of the inserting station. The elevational view of FIG. 3A represents a region located approximately in the middle of FIG. 2 (viewed in the same direction) in enlarged form and includes details that, for clarity's sake, have been omitted from FIG. 2.

An upper part of vacuum gripper drum 84 and vacuum arms 122, including arm vacuum holes 124, as hereinbefore described in conjunction with FIG. 3, are shown here in (in FIG. 3A) comprised in inserting station 32. Further comprised in inserting station 32 are stop fingers 125, suction cups 125A, a pair of opening fingers 125B mounted on revolvable shafts 125C, insert pushers 126, and spring-loaded drop rollers 126A. A horizontally disposed top plate 126B having a trailing end 126C is partially shown (in a location substantially along track bed 60 indicated in FIG. 2). Also indicated here is a leading portion of conveyor belt arrangement 107. An envelope 127 is shown disposed substantially horizontally in a location upon vacuum arms 122 to which it has been delivered by vacuum gripper drum 84 (and vacuum disc 114), as hereinbefore decribed. Envelope 127 has a top side 127A, a bottom side 127B, and a flap 127C that is held open in a slightly downwardly directed orientation by and below trailing end 126C of top plate 126B. Also shown here is an insert stack package 198 disposed upon top plate 126B and being propelled by insert pushers 126 toward the right for insertion into envelope 127. The travel motion of the uppermost tips of insert pushers 126 in the course of a complete insertion cycle is indicated by phantom lines as locus pattern 'L'. Locus pattern 'L' follows approximately an horizontally elongated noose-shaped form. Insert pushers 126 are translated in a vertical plane along locus pattern 'L' without changing angular orientation during the travel motion of an insert cycle. Insert pusher 126 is shown in a position during the beginning of an insertion cycle. Other salient positions are also indicated in dotted lines by pusher position 126', representing a low position near the end of the retraction portion of an insertion cycle, and by pusher position 126'', representing the end of the retraction portion and the beginning of the insertion portion of an insertion cycle. The apex of the travel motion of insert pusher 126 at the point of travel direction reversal on the right end of locus pattern 'L' is designated as insertion end 'I'.

It should be recognized that, whereas certain components are shown singly in FIG. 3A for the sake of simplicity and clarity of the depiction and description, a plurality of identical components are necessarily present and disposed in appropriately spaced paralled positions perpendicularly to the plane of the depiction in front of or hidden behind each such component, as is customary in mail handling equipment; for example, there is a plurality of stop fingers 125, suction cups 125A, insert pushers 126, drop rollers 126A, top plates 126B, etc. Moreover, the depiction omits obstructing components that could be detrimental to clarity of understanding of their interrelationships and their functions.

As hereinbefore described in conjuction with FIG. 3, vacuum gripper drum 84 conveys envelops in a clockwise direction upwardly to a horizontal position upon vacuum arms 122, as indicated by envelope 127 in FIG. 3A. Envelope 127 is delivered to this position through a gap between trailing end 126C (of top plate 126B) and the periphery of vacuum gripper drum 84 and is moved farther beneath the bottom surface of opening fingers 125B onto vacuum arms 122. At this time, opening fingers 125B have orientations that are approximately 80 degrees from their shown orientation so that their tips substantially point toward one another. The envelope is stopped when its leading edge is intercepted by stop fingers 125, that were previously rotated into the substantially vertical orientation shown. The envelope's top side has now passed beneath and cleared opening fingers 125B by a small distance. In this position, the envelope's trailing flap 127C is held below the level of top plate 126B in the region of trailing end 126C thereof. As described before, bottom side 127B of envelope 127 is held down upon vacuum arms 122 due to the action of vacuum valved to arm vacuum holes 124. Suction cups 125A descend now onto the envelope's top side 127A and, having vacuum valved thereto, attach to top side 127A. Thereafter, suction cups are lifted up or retracted to the position shown, so that the envelope's top side 127A is thereby lifted up and separated from bottom side 127B and forms an open pocket, as shown here.

Opening fingers 125B are now rotated by their shafts 125C (one finger clockwise and the other finger counterclockwise) by approximately 80 degrees into the orientation indicated, so that their tips slice into the opened pocket of the envelope; i.e. beneath top side 127A. This finger position and orientation is now substantially along and parallel to the internal side edges of the opened envelope. Opening fingers 125B have a substantially rectangular or square C-channel-shaped thin-walled cross-section whereby the C-channel is disposed with a side wall facing downwardly and its open side facing toward the middle of envelope 127 in the orientation shown in order to reliably guide insert stack package 198 into envelope 127 during the subsequent insertion operation. For the latter purpose, opening fingers are customarily also provided with ramplike leading edges. As indicated, the height of fingers 125B is somewhat reduced in direction toward their tips and their tips are smoothed and slightly rounded off to avoid sharp edges that might catch on the envelope during finger rotation therein and on inserts during insertion thereof.

Envelope 127 has now been readied for insertion as hereinabove described and insert pushers 126, that have risen from beneath top plate 126B and that have intercepted insert stack package 198 along its trailing edge, move horizontally toward the right and push insert stack package 198 between opening fingers 125B into envelope 127. As indicated by insertion end 'I' of locus pattern 'L' insert pushers 126 push insert stack package 198 to a position vicinal to the hinge line of the envelope's flap 127C. Thereafter, insert pushers 126 retract along locus pattern 'L', as indicated by arrows thereupon. Vacuum to suction cups 125A and to arm vacuum holes of vacuum arms 122 is vented and valved off by now and drop rollers 126A descend onto the insert-filled envelope 127 and nip it in spring-loaded manner onto driven conveyor belt arrangement 107, whilst stop fingers 125 are pivoted in anti-clockwise direction out of the way of the envelope.

Envelope 127 is frictionally engaged by conveyor belt arrangement 107 and is propelled toward the right and slides under and along suction cups 125A. Envelope 127 thusly also withdraws form opening fingers 125B, which thereafter are rotated approximately by 80 degrees back to the orientation indicated hereinabove, having their tips substantially pointing toward one another. The insert-filled envelope is propelled into fall region 74, as hereinbefore described in conjunction with FIG. 2.

The translational motion of insert pushers specifically along elongated noose-shaped locus pattern 'L' is provided in order to achieve two main objectives; the horizontal straight-line inserting motion and the rearward and simultaneously downwardly curved retraction motion. Insert stack packages, being conveyed by pin conveyor 34 (FIG. 1) in main track bed 60 along main base 62 by pusher pins 96 (FIG. 7), are seriatim transported to the approximate region indicated by the location of insert stack package 198 disposed upon top plates 126B (in FIG. 3A).

Insert pushers 126 must be moved out of the way of a next insert stack package being conveyed to this region in the vicinity of the shown insert pushers 126 and are, therefore, disposed beneath top plates 126B at that time, as indicated by locus pattern 'L' and, for instance, insert positions 126' or 126" therealong. Thereafter, insert pushers 126 are translated upwardly and eventually toward the right so that they are raised through gaps between top plates 126B, engage the trailing edges of insert stack package 198, and push it horizontally to the right into envelope 127, as hereinbefore described.

Once insert package 198 is inserted in envelope 127, insert pushers retract from insertion end 'I' and gradually sink downwardly beneath top plates 126B along the path indicated by locus pattern 'I'. This rearward and downward retraction, however, must not interfere with the next envelope that is being carried by then upon vacuum gripper drum 84 in clockwise direction upwardly. This is the reason for the gradually curved path that, therefore, permits fastest possible downward and rearward retraction of insert pushers 126, while simultaneously allowing clearance for delivery of the next envelope upon vacuum gripper drum 84, and, also simultaneously, permitting an early downward retraction of insert pushers beneath top plates 126B to facilitate delivery of the next insert stack package thereupon. It should be borne in mind that the operation of the components and mechanisms and thusly the transport of insert stack packages and envelopes are appropriately synchronized and phased and are intended to operate at high throughput rates. Consequently, travel distances are kept to a minimum and spacing between seriatim handled insert stack packages and envelopes, respectively, are also kept as small as practical.

The translational motion of insert pushers 126 along locus pattern 'L' is provided by a drive mechanism (disposed beneath insert pushers 126 and below top plate 126B and not shown here) that comprises a trolley, upon which insert pushers 126 are mounted, and which is free to travel horizontally upon a trolley bar arrangement that, in turn, is cam-driven vertically up and down. The horizontal translation of the trolley is provided by an endless chain drive about two horizontally displaced sprocket arrangements. Appropriate dimensional and phasing relationships between these trolley drive arrangements provide the locus pattern 'L'.

Figure 3B:
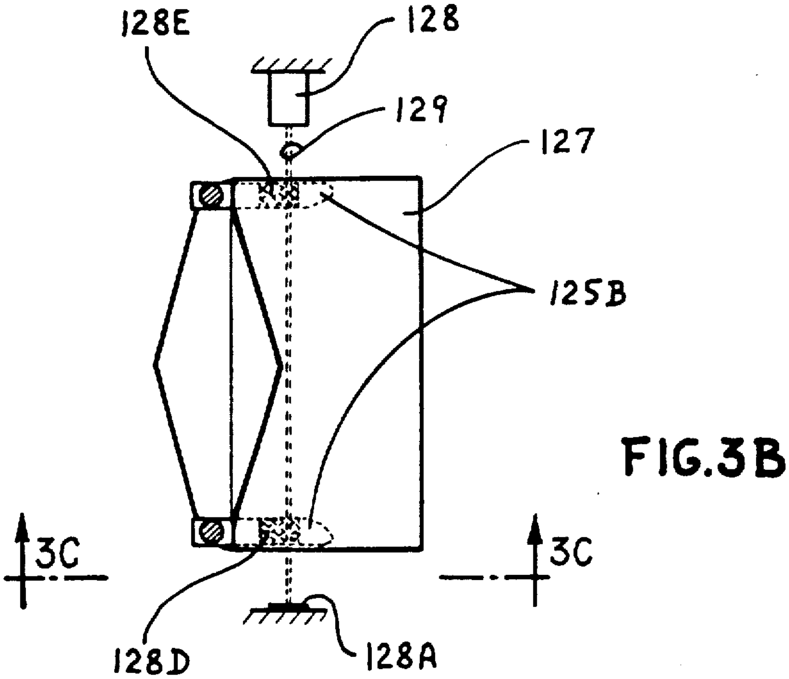
FIG. 3B is a schematic top view of a partial detail of an insertion jam detection arrangement according to an embodiment of the invention.
Figure 3C:
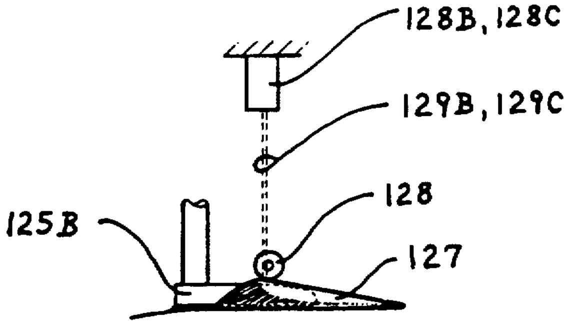
FIG. 3C is a schematic side view of a partial detail of the insertion jam detection arrangement depicted in FIG. 3B.

Referring now to FIGS. 3B and 3C, an insertion jam detection arrangement that is schematically depicted therein and that is disposed in inserting station 32 (FIG. 1, 2, and 3A), comprises a horizontal and a vertical retroreflective sensing arrangement. The horizontal sensing arrangement comprises a photosensor 128 and a retroreflective target surface 128A that are mounted within inserting station 32. The vertical sensing arrangement comprises a pair of photosensors 128B and 128C (hidden behind 128B) and a pair of retroreflective target surfaces 128D and 128E that are disposed upon the top sufaces of each of the opening fingers 125B. Target surfaces 128A, 128D, and 128E are of conventionally used retroreflective material, for instance retroreflective adhesive tape or pads as customarily used in conjunction with photosensors. Envelope 127 is shown in the same position as also depicted in FIG. 3A, being disposed in inserting station 32 in readiness for insertion of an insert stack package. Opening fingers 125B are shown as depicted in FIG. 3A, i.e. having their tips disposed within the opened pocket of envelope 127.

A horizontal sensing beam 129 is directed by photosensor 128 onto target surface 128A and is reflected thereby back into photosensor 128 which senses any interruption of the beam therebetween. As shown, beam 129 traverses at least the entire length of envelope 127 and is disposed slightly above the upper surface of the opened envelope 127 so that an obstruction of the beam in this region will be detected. For example, interruption of beam 129 will occur as a consequence of malfunctions such as for instance caused by damaged, misaligned, and buckled envelopes having been fed to inserting station 32, or by envelopes having been buckled or curled up by opening fingers 125B (during their rotation) trying to enter into the envelope pocket, for instance if suction cups 125A (FIG. 3A) malfunction. In general, any undesirable lifting up of a portion of envelope 127 into the path of beam 129 results in detection of a fault condition. Horizontal beam 129 detects not only malfuctions associated with envelopes, but also problems caused by and during insertion of insert stack packages that result in envelopes or inserts lifting into the path of beam 129. For instance, jamming by piling up of insert and envelope material will be detected. Sampling of the sensor signal at appropriate times during the insertion cycle provides signals that are capable of discerning the type of malfunction more specifically.

Vertical sensing beams 129B and 129C are directed by photosensors 128B and 128C, respectively, toward target surfaces 128D and 128E, respectively, and are reflected thereby back into the respective photosensors, provided that the beams are not interrupted. In the depictions of FIGS. 3B and 3C, opening fingers 125B and therewith target surfaces 128D and 128E have entered into the opened pocket of envelope 127. Consequently, sensing beams 129B and 129C are interrupted by the top side of the open envelope 127. Vertical sensing beams 129B and 129C primarily serve for detection of the presence of a correctly opened envelope (having both opening fingers 125B inserted therein) by sampling of the signals generated by photosensors 128B and 128C at the appropriate time during the insertion operation. It has been found that the insertion jam detection arrangement, comprising the combination of the hereinabove described horizontal and vertical retroreflective sensing arrangements, is capable of detecting most, if not all, fault conditions that can potentially occur in the course of an inserting operation, whether they are caused by actual insertion malfunction or due to damaged or misaligned inserts or envelopes (or absences of envelopes). As a consequence of detection of a fault condition, appropriate action is taken automatically (under control of the equipment's computer system), for example either by subsequent diversion of damaged or jammed material or by stoppage of the equipment and fault location indication for the operator's attention.

Figure 4:
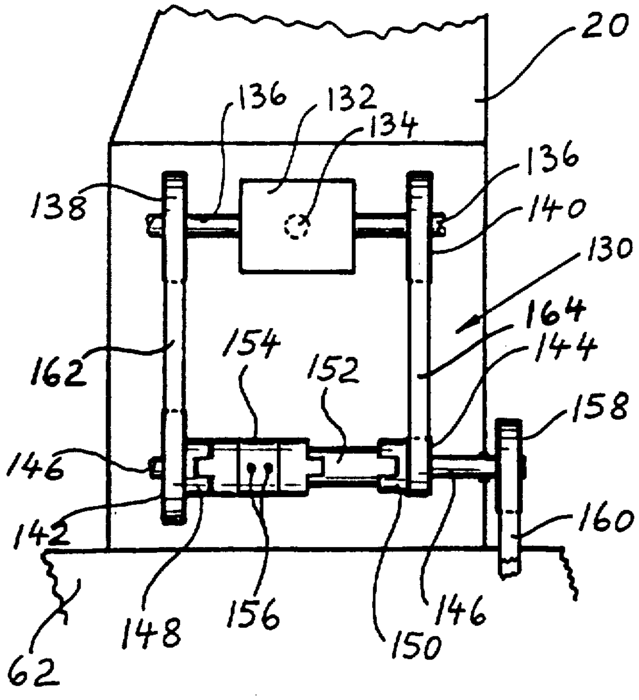
FIG. 4 is a schematic partial side elevation view of a speed change device of a modular rotary inserter station indicated in FIG. 1.

Referring to FIG. 4, a speed change device 130 is disposed within each insert feeder module, for example insert feeder module 20, and serves to selectively change drive speed of the insert feeder operation, in general between normal speed and half speed (in relationship to the speed of pin conveyor 34). Speed change device 130 comprises an angle drive box 132 for driving the mechanism of insert feeder module 20 via a box axle 134, a box drive shaft 136 upon which a first and a second pulley 138 and 140 are mounted on either side of angle drive box 132, and a first and a second clutch pulley 142 and 144, both pulleys being borne in free-running manner upon a clutch drive shaft 146, and each pulley comprising a clutch half coaxially disposed therewith; namely a first clutch half 148 being comprised in first clutch pulley 142 and a second clutch half 150 comprised in second clutch pulley 144.

Further comprised in speed change device 130 is a clutch shaft 152, disposed coaxially upon clutch drive shaft 146 between first and second clutch pulleys 144 and 146, that is secured to clutch drive shaft 146 (or that may be of unitary structure therewith). A double-sided claw clutch 154, including a clutch securing means 156, is borne coaxially slideably upon clutch shaft 152. Claw clutch 154 is selectably securable to clutch shaft 152 by clutch securing means 156 to either engage first clutch half 148 (as shown) or second clutch half 150 for driving of either first clutch pulley 142 or second clutch pulley 144, respectively. Clutch securing means 156 may be any conventional device used for such purposes, for instance screws, and claw clutch 154 may be slideably keyed upon clutch shaft 152 in conventional manner. Appropriate bearings, that are not specifically shown here, are provided for box drive shaft 136 and for clutch drive shaft 146. Clutch drive shaft 146 is provided with an inserter drive pulley 158 secured to one end thereof. An inserter drive belt 160 provides motive power to inserter drive pulley 158 from a here not shown motor-driven jack shaft located in main base 62 of the in-line rotary inserter apparatus of this invention.

First box pulley 138 is connected with first clutch pulley by a first belt 162 and second box pulley 140 is connected with second clutch pulley by a second belt 164. In an embodiment of this invention, as shown in FIG. 4, second clutch pulley 144 is of one half the diameter of first clutch pulley 142 (while pulleys 138 and 140 are of the same size). Consequently, whereas the shown clutch engagement of claw clutch 154 with first clutch half 148 results in a first drive speed transmitted to angle drive box 132, the alternate selectable clutch engagement of claw clutch 154 with second clutch half 150 results in a drive speed transmitted to angle drive box 132 that is one half of the first drive speed. Naturally, other preselectable speed change ratios may be chosen by appropriate choices for relative pulley diameters.

The half-speed facility for insert feeder module 20 (or any other insert feeder module of the apparatus) is generally preselected for operation when inserts are to be processed that may be difficult to handle by an insert feeder module at the high speeds of the apparatus, as for instance given by inserts from very thin materials. However, in order that the speed of the entire apparatus need not be slowed down for such materials, for example two or more insert feeder modules handling the particular difficult-to-handle inserts are used to provide such inserts, each operating at one half of the speed of other insert feeder modules, thusly being capable of providing the required high delivery rate of even the difficult inserts to pin conveyor 34 and thereby to inserting station 32 in appropriate synchronism with the operation of the apparatus.

Figure 5:
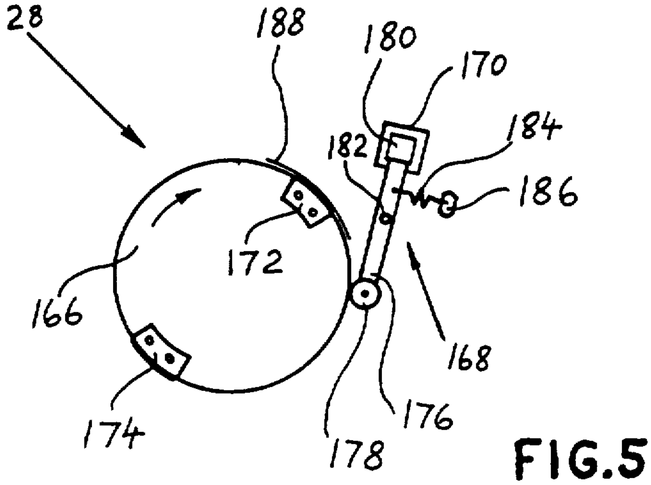
FIG. 5 is a schematic partial detail side view of an insert thickness sensing arrangement on a gripper drum of a modular rotary inserter station indicated in FIG. 1.

Referring now to FIG. 5, insert thickness detector 28, disposed in every insert feeder module (for example in insert feeder module 20), comprises an insert gripper drum disc 166 of an insert gripper drum employed for transport of inserts between insert hopper and pin conveyor 34, a detector caliper assembly 168, and a Hall sensor device 170. Insert gripper drum disc 166 includes a first and a second anvil 172 and 174 that are adjustably secured to a face thereof at its periphery and that are spaced substantially by 180 degrees. Anvils 172 and 174 are positioned on the face of insert gripper drum disc 166 such that their peripheral surfaces are flush or slighly raised above the periphery of insert gripper drum disc 166. Detector caliper assembly 168 comprises a caliper arm 176, a follower roller 178 rotatably mounted at one end thereof, a permanent magnet 180 mounted at the other end of caliper arm 176, a caliper pivot 182 upon which caliper arm 176 is rotatably mounted, and a tension anchor spring 184 that is, at one end thereof, attached to caliper arm 176 and that is anchored by an anchor 186. Anchor 186, caliper pivot 182, and Hall sensor device 170 are attached to the frame structure of insert feeder module 20 (not specifically shown here). Hall sensor device 170 is disposed in close proximity to magnet 180, senses lateral relative displacement thereof, and generates an electrical signal corresponding to such displacement. Gripper drum disc 66 is a face disc comprised in an insert gripper drum assembly which is rotatably borne within the frame structure of insert feeder module 20.

Follower roller 178 rolls upon periphery of drum disc 166 and upon peripheral surfaces of anvils 172 and 174, as it is spring-loaded thereagainst by the action of anchor spring 184 upon caliper arm 176. Follower roller 178 also rolls over any insert, for instance an insert 188, that is disposed upon periphery of drum disc 166. Caliper arm 176 pivots about caliper pivot 182 in dependence on the radius of rotation of each point on the periphery of drum disc 166, of anvils 172 and 174, and of insert 188. This pivoting action causes magnet 180 to move relative to the stationary Hall sensor device.

In operation, the insert gripper drum revolves about its axis carrying inserts held (gripped) upon its periphery and transporting such inserts in generally conventional manner. In particular, inserts are carried upon the periphery of drum discs, specifically as shown in FIG. 5 by example of insert 188 disposed upon insert gripper drum disc 166. Insert 188 is disposed over first anvil 172. Anvils 172 and 174 are adjusted to have their peripheral surfaces concentric about the axis of rotation of gripper drum disc 166, since the periphery of the latter may not be sufficiently concentric with respect to its rotational axis to facilitate its use as a fixed reference for insert thickness measurement. The signal generated by Hall sensor device 170 corresponds to the radius following by follower roller 178 about the axis of rotation. In particular, this signal is sampled during the time when anvils 172 and 174 pass by follower roller 178. Correctly adjusted anvil positions result in identical signals (in absence of inset 188) that, therefore, reflect equal radii (of rotation) for both anvils. Presence of insert 188 causes a lifting of follower roller 178 by the thicknes of insert 188 and a consequent relative change in signal generated by Hall sensor device 170 that provides an accurate measure of thickness of insert 188.

Anvils 172 and 174 are not required in another embodiment of insert thickness detector 28, wherein the respectively sampled signals from Hall sensor device 170, corresponding to positions of inserts upon gripper drum disc periphery (in absence of such inserts), are stored by a computer and used as reference signals to compute signals reflecting thickness of particular inserts when present. Consequently, lack of concentricity (and inaccuracies in roundness) of insert gripper drum disc 166 about its axis of rotation is compensated without a need for anvils 172 and 174 and any positional adjustment and calibration thereof.

Insert thicknes detector 28 is used in insert feeder modules particularly as a so-called "miss and double detector" to detect faulty equipment operation such as given by an absence of an insert (when there should be one present) and the presence of more than one insert thickness (indicating an undesirable fold, multiple insert feed from hopper, and other faulty conditions). Generally, Hall sensor device signals are compared with preset limits, corresponding to thickness ranges, to allow for permissable insert thickness variations and tolerable dimensional structural changes as, for instance, might occur in operation due to temperature variations, due to backlash, mechanical wear, vibration, etc.

Figure 6:
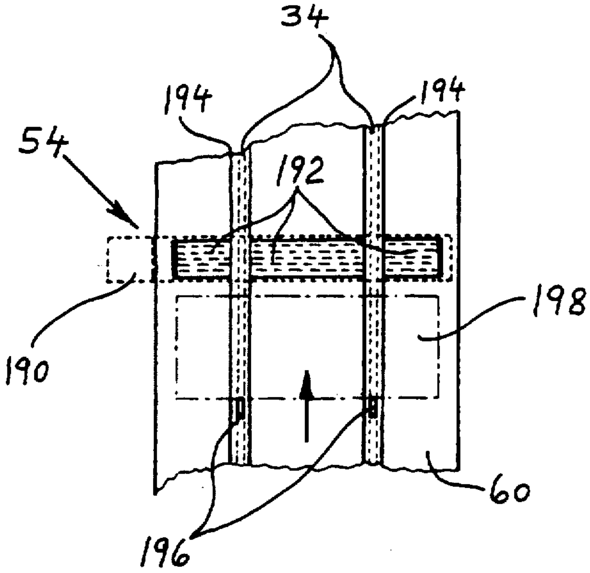
FIG. 6 is a schematic fragmented top view onto a portion of an insert conveying surface of an in-line rotary inserter of the present invention.

Referring now particularly to FIG. 6 in conjunction with FIGS. 1 and 2, skew detector arrangement 54 is disposed on and above main track bed 60 and comprises a skew detector bridge 190 having a plurality of downwardly-looking photosensors mounted therein and a plurality of retro-reflectors 192 disposed below skew detector bridge 190 upon the upper surface of main track bed 60. Skew detector bridge 190 is indicated in dotted lines in FIG. 6 so as not to obscure the depiction of other components. Pin conveyor 34 (indicated by dash lines) is disposed below the surface of main track bed 60 and comprises, in two parallel rows, a plurality of equi-spaced upwardly pointing pusher pins 196 (two of which are shown here) which protrude above main track bed 60 through slots 194 and which move therein along main track bed 60. A typical insert stack package 198 (indicated by phantom lines) is indicated as it is pushed along and upon the surface of main track bed 60 by the appropriate pair of pusher pins 196, being conveyed thereby from inserter modules to envelope stuffing station 32.

Photosensors in skew detector bridge 190 are directed toward retro-reflectors 192 so that the presence of an insert or an insert stack is sensed. In particular, the sensing operation of the photosensors is timed in synchronism with the conveying motion of pin conveyor 34 and leading and trailing edges of insert stack package 198 are sensed in a plurality of transversal locations across main track bed 60 over retro-reflectors 192. Detected signal levels of individual transversal photosensors are compared for relative transversal incidence timing by sensing of relative obstruction of retro-reflector areas by insert stack package edges. Evaluation processing of these signals is performed in dependence on machine speed (speed of pin conveyor 34), thusly establishing limiting tolerance levels for permissible insert package stack skew and other misalignments (for instance also relative misalignment of individual inserts in an insert stack package) as a function of machine speed. Such limiting tolerance levels are preprogrammable in order to provide allowance for different insert materials and, particularly, to pre-establish automatic rejection threshold limits for insert stack package skew and misalignment (also as a function of machine speed).

Figure 7:
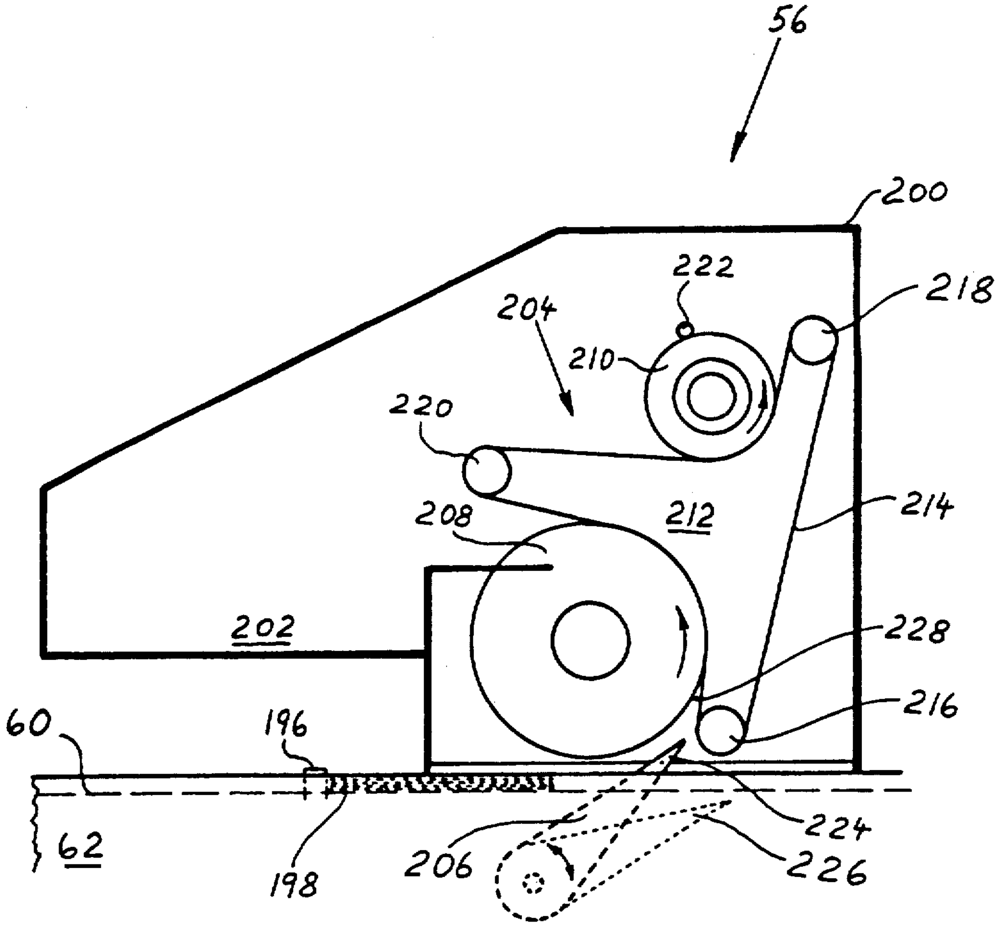
FIG. 7 is a schematic fragmented side elevational view of an insert diverter of the present invention.

Referring now to FIG. 7, insert diverter 56 is schematically depicted fragmented in side elevation as it is disposed upon main base 62 (see also FIGS. 1 and 2). Also indicated here is a pusher pin 196 of pin conveyor 34 as it pushes insert stack package 198 along upper surface of main track bed 60 (from a left to right). Insert diverter 56 comprises a diverter housing 200, an insert reject catch tray 202, and a divert pulley system 204. Although disposed within main base 62, a selectively positionable two-position reject gate 206 including its actuation mechanism is a part of insert diverter 56. Divert pulley system 204 comprises a motor-driven divert drive roller/pulley 208, a motor-driven belt drive pulley 210, and a triple pulley belt arrangement 212 in mutual engagement via an endless divert belt 214. Triple pulley belt arrangement 212 comprises a floating idler pulley 216 which is carried on a here not shown lever that freely pivots about the axis of belt drive pulley 210 and that is spring-loaded against an adjustable stop in clock-wise direction. This lever also carries an idler lever pivot 222 which is linked by a here not shown link to the axle of a take-up idler pulley 218. This link is spring-loaded (about axis of idler lever pivot 222) in counter-clockwise direction to keep divert belt 214 tensioned. A fixed idler pulley 220 is mounted in fixed position within housing 200. Resiliently tensioned divert belt 214 is driven by belt drive pulley 210. It should be clearly understood that, whereas for clarity's sake the above description is given in singular terms for pulleys 208 and 210 and for triple pulley belt arrangement 212, a plurality of substantially identical components in spaced parallel arrangement is necessarily present in the described relationship in order to provide appropriate operation. Thus, for instance, at least two pulleys 208, 210, 216, 218, and 220 and two belts 214 are required (the second and any further sets being hidden in FIG. 7).

In operation, when an insert stack package, for example package 198, is to be rejected, reject gate 206 is actuated on turn to its upward reject position 224 from its by-pass position 226 below the surface of main track bed 60. Insert stack package 198 is consequently pushed onto reject gate 206 by the normal conveying motion from pusher pins 196, having its leading edge lifted upwardly and guided into a reject nip region 228 between divert belt 214 and divert drive roller/pulley 208. Insert stack package 198 is grabbed in nip region 228 and diverted and lifted upwardly away from the path of pusher pins 196 (of pin conveyor 34), and it is transferred into insert reject catch tray 202. Upon diversion of a rejected insert stack package, reject gate 206 is returned to its by-pass position 226. Reject gate positioning is performed in conventional manner, for instance by a spring-loaded solenoid in response to appropriate energizing signals for example from main computer 50 (or a subsidiary system thereof). For example, excessive misalignment or skew of an insert stack package sensed by skew detector arrangement 54 (described hereinbefore) initiates the divert action in insert diverter 56.

Figure 8:
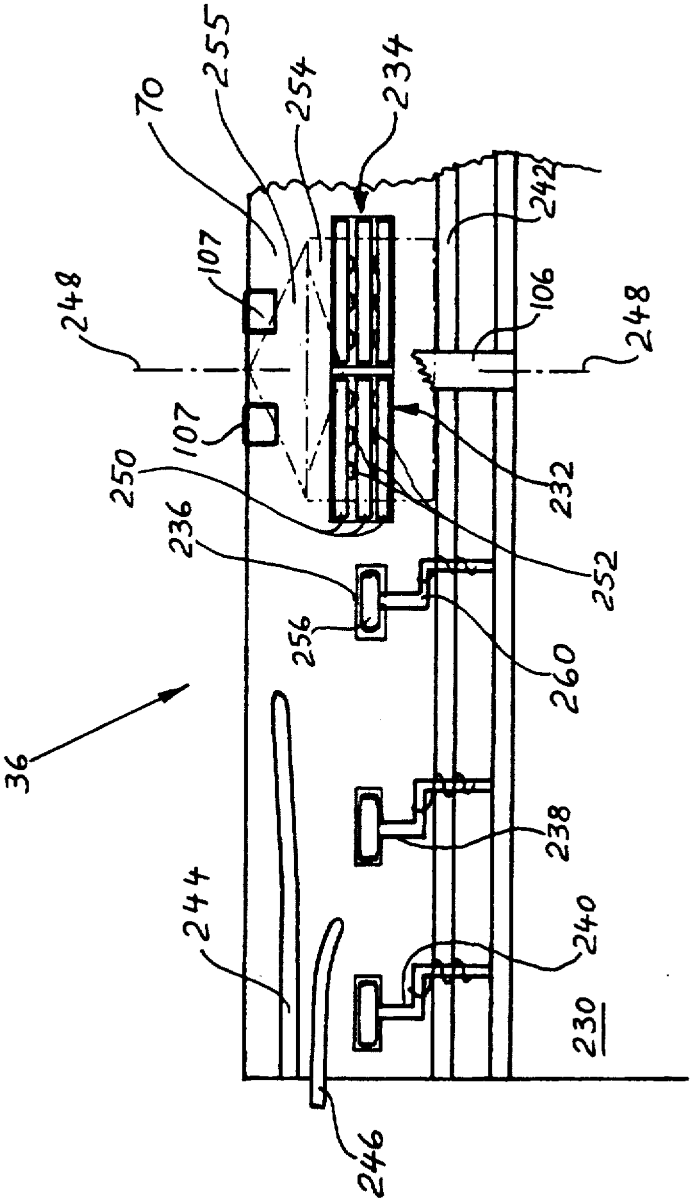
FIG. 8 is a schematic angled top view off a vacuum-belt transporter/diverter unit (in a viewing direction indicated by direction arrow 8 in FIG. 2)

Referring now to FIG. 8, vacuum belt transporter/diverter unit 36 is schematically depicted as seen perpendicularly to its angled upper surface (corresponding to first sloping wall 70 in FIG. 2) in a viewing direction indicated by direction arrow 8 in FIG. 2. Vacuum belt transporter/diverter unit 36 comprises first sloping wall 70, fall region 74, and deflector bar 106, as hereinbefore described. Vacuum belt transporter/diverter unit 36 further comprises an enclosed stand 230 upon which first sloping wall 70 is disposed and within which various here not shown components are included. Vacuum belt transporter/diverter unit 36 also includes (substantially disposed upon first sloping wall 70) at least a first vacuum belt 232 and it may include also a second vacuum belt 234. Further comprised in vacuum belt transporter/diverter unit 36 (and substantially disposed upon first sloping wall 70) is an assist slip roller arrangement 236, a first and a second advance roll arrangement 238 and 240, a lower guide 242 which is adjustable to suit different envelope widths, an upper guide 244, and a leading portion of a flap guide 246.

First and second vacuum belts 232 and 234 are of identical structure, except that first vacuum belt 232 has its upper surfaces driven toward the left side and second vacuum belt 234 has its upper surfaces driven toward the right side. When second vacuum belt 234 is present, its serves to selectively divert and transport inserted envelopes toward the right to further equipment, which may comprise various envelope handling equipment not specifically described herein or which may comprise substantially similar or identical units to those described herein (for the left side); for example including a continuation of a vacuum belt transporter/diverter unit as shown here in FIG. 8, except that this unit would be then in form of a mirror image with respect to a vertical center plane 248. Alternately, second vacuum belt 234 (when present) may serve for selective diversion of envelopes that have been inserted with inserts, but that have been stigmatized as faulty, for instance because of errors or damage having occurred during insertion such that rejection becomes necessary.

Vacuum belt 232 comprises a plurality of endless belts 250 (for instance flat belts) driven upon appropriate pulleys and disposed side-by-side and spaced apart by a small distance, having their upper surfaces disposed substantially slightly above the surface of first sloping wall 70 and having their upper surfaces move toward the left. Below upper surfaces of endless belts 250, a block is arranged having a plurality of orifices 252 disposed in its upper surface and having its upper surface disposed substantially in the plane of the surface of sloping wall 70. Orifices 252 are disposed in spaces between endless belts 250 and are connected via selectively actuatable valving to a vacuum source. An inserted envelope 254, having a flap 255, is indicated here by phantom lines in a position (in fall region 74 indicated in FIG. 2) to which it has been delivered from inserting station 32 along main track bed 60 upon conveyor belt arrangement 107, as hereinbefore described. Selective vacuum valving actuation, providing vacuum to orifices 252 (or to corresponding orifices in second vacuum belt 234), causes inserted envelope 254 to be drawn onto endless belts 250 and thereby results in sufficient friction between belts 250 and envelope 254 to cause transport of envelope 254 toward the left (or toward the right, if corresponding orifices in second vacuum belt 234 are selectively provided with vacuum). If first vacuum belt 232 is exclusively used during a particular production run or if second vacuum belt 234 is not present, and thusly envelope diversion is only intended toward the left side, valving of vacuum to orifices 252 at the appropriate instant in time when an envelope has been delivered onto vacuum belt 232 may be omitted in favor of having vacuum connected continuously to orifices 252.

Assist slip roller arrangement 236 comprises a driven lower roller (not visible here) that is disposed below sloping wall 70 with its periphery reaching substantially to the surface level of sloping wall 70, and an upper roller 256 in spring-loaded peripheral contact with the lower roller. For this purpose, upper roller 256 is borne upon a spring-loaded crank arrangement 260 that is attached to sloping wall 70. Assist slip roller arrangement 236 provides relatively low friction properties with respect to envelope 254, particularly to facilitate partial slippage of the envelope in a perpendicular direction to the direction of transport motion, as will be described hereinafter.

First and second advance roll arrangements 238 and 240 are constructed substantially similarly to assist slip roller arrangement 236, except that their frictional properties do not have to allow envelope slippage. Roll arrangements 238 and 240 provide for farther transport or advancement of inserted envelopes toward the left. Lower guide 242 is disposed along the lower portion of the face of vacuum belt transporter/diverter unit 36 for guiding of the lower edge of inserted envelope 254 as it is transported in unit 36. Upper guide 244, having a leading portion at a slightly larger distance from lower guide 242 than its trailing portion, is disposed along a part of the upper portion of the face of vacuum belt transporter/diverter unit 36 and serves to guide the upper edge of inserted envelope 254 into substantial alignment therewith and with the lower guide 242, as envelope 254 is transported in unit 36. In order to provide for such alignment, a slight slippage of envelope 254 transverse to the direction of transport is facilitated by provision of relatively low friction in assist slip roller arrangement 236 in a perpendicular direction to the transport motion. Various conventional measures to lower such friction may be utilized. For instance, roller surface material may be of relatively low frictional properties, such as for example given by high-density polyethylene, rollers may be crowned, spring-loading force between the roller pair may be reduced, etc.

In respect to the above description of a preferred embodiment of roller arrangements, it should be understood that either the assist slip roller arrangement 236 or the first advance roll arrangement 238 or both arrangements can be dispensed with, provided the distance between the envelope engagement by the first vacuum belt 232 and the engagement by the remaining closest roller arrangement is appropriately adapted so that an envelope is reliably engaged and transported from first vacuum belt 232 to being delivered by vacuum belt transporter/diverter unit 36 to further equipment. Thus, for instance, removal of assist slip roller arrangement 236 will permit a transported envelope (that leaves the engagement with first vacuum belt 232 and that may be in a slightly skewed orientation) to fall upon lower guide 242 and align itself therewith, being assisted in this alignment by the lead-in of upper guide 244. The inertia of the moving envelope will carry if further in direction of its transport motion until it is nipped between the rollers of the next advance roll arrangement 238 (or 240, if 238 has been removed) and is transported thereby further. Removal of arrangement 236 and/or 238 and the consequent need for reliance on inertial envelope travel for a short distance limits somewhat the range of envelope sizes and masses handleable by the equipment. However, it has been found that reliable operation is achieved over a surprisingly large range of sizes and masses that amply satisfy the needs of normal commercial applications. It will be appreciated that removal of one or both of these roll arrangements provides for advantages in economy in space requirements and in equipment cost, albeit at some limitation in universal applicability. Of course, when the equipment is intended for the widest range of envelope properties, arrangements 236 and 238, as depicted in FIG. 8, are retained.

First and second vacuum 232 and 234, assist slip roller arrangement 236 and first advance roll arrangement 238 are either separately powered and driven or they are driven by conveying and transporting drives of main track bed 60 that eventually deliver inserted envelope 254 to vacuum belt transporter/diverter unit 36, as hereinbefore described. Second advance roll arrangement 240 is driven from (and at a speed in accordance with the requirements of) the follow-up equipment to which vacuum belt transporter/diverter unit 36 feeds inserted envelopes. The transporting speed of second advance roll arrangement 240 may be lower than the speed of conveying drives of main track bed 60. In an embodiment of the present invention, this follow-up equipment is sealing module 38, as hereinbefore described in conjunction with FIG. 1. In order to accommodate a difference in driving speeds, second advance roll arrangement 240 employs an overriding clutch in the drive to its driven lower roller so that inserted envelope 254, upon entering the nip of second advance roll arrangement 240, does not buckle, but is allowed to be fed to it at a higher speed until it is engaged only by second advance roll arrangement 240, whereupon it is farther transported thereby at the lower drive speed thereof.

Figure 8A:
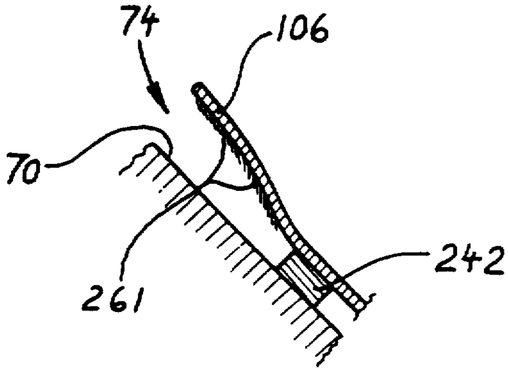
FIG. 8A is a schematic vertical sectional view of a portion of FIG. 8 (sectioned along center plane 248)

Deflector bar 106, also depicted in FIG. 2, is partially shown in FIG. 8 in the region of its mounting to the lower portion of sloping wall 70 and is also shown in FIG. 8A in section along center plane 248 (indicated in FIG. 8). Deflector bar 106 is shaped to deflect an inserted envelope being delivered thereunder so that the envelope's leading edge contacts bar 106 and slides thereon downwardly until it stops upon lower guide 242 (as indicated by position of shown envelope 254) before the envelope's lower surface contacts vacuum belt 232 (and vacuum belt 234, of present). Deflector bar 106 may be comprised of one or more appropriately shaped bars to provide the described envelope guiding action in a secure manner, for instance also to avoid skewing or other misalignment of an envelope, during its delivery into fall region 74 (FIG. 2). Moreover, as shown in FIG. 8A, deflector bar 106 may comprise in regions of its lower surface (facing first sloping wall 70) brushes 261 to enhance the described guiding action and to reduce bounce of envelope 254 as it impacts upon the bristles of brushes 261 during delivery into fall region 74. Brushes are conventionally used in many different devices for sheet and envelope handling, in particular for low-friction guidance and force-application as sheets and envelopes are moved in sliding contact with and past such brushes. The bristles of brushes 261 are downwardly oriented in direction of deflection of envelopes being delivered under bar 106.

In operation, delivered envelope 254 is selectively diverted either to be transported to the right or to the left by appropriately selective valving of vacuum to second of first vacuum belt 234 or 232, respectively. Assuming envelope 254 is transported to the left, it is engaged by assist slip roller arrangement 236 and farther transported to be engaged by first advance roll arrangement 238 and second advance roll arrangement 240, whilst it is aligned between lower and upper guides 242 and 224 to assure correction of any envelope skew of misalignment. Upper guide 224 is appropriately curved to assist in such alignment. Envelope 254 may be slowed down, once it becomes engaged by second advance roll arrangement 240, to conform to the transport speed requirements of subsequent follow-up equipment, for instance sealing module 38, as hereinbefore indicated. During transport of envelope 254 into the region between roll arrangements 238 and 240, the leading portion of appropriately curved flap guide 246, that is disposed above sloping wall 70 leaving sufficient distance therebetween to clearly pass the insert-filled envelope 254, intercepts the at least partially open and lifted-up flap 255 (of envelope 254) from therebelow. In farther transport of envelope 254, flap 255 remains now guided above and upon flap guide 246.

Figure 9:
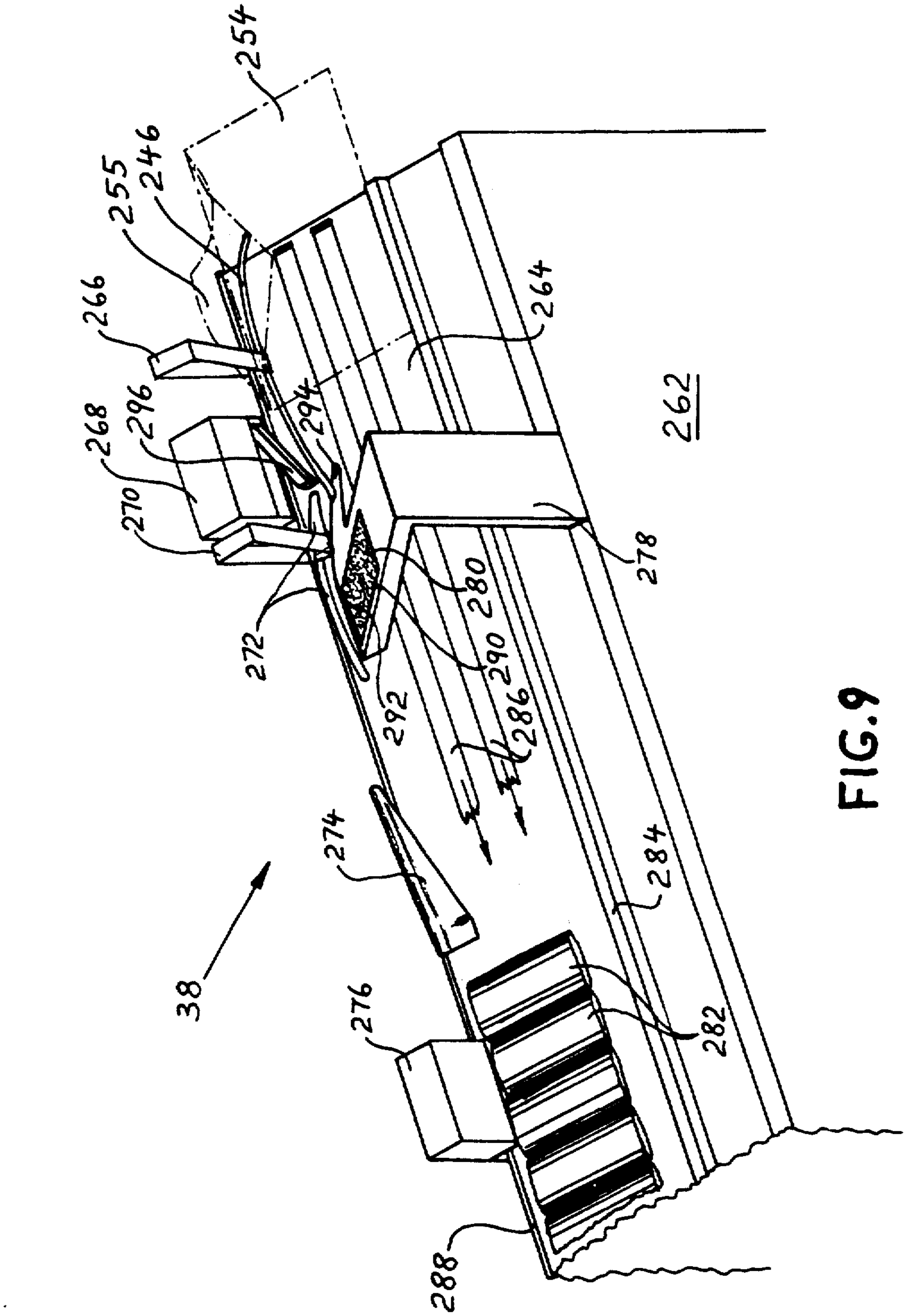
FIG. 9 is a schematic partial isometric view of salient features of a sealing module (indicated in FIG. 1)

In reference to FIG. 9, envelope sealing module 38 depicted therein comprises a console 262 having a sloping surface 264 disposed in continuation of and in line with sloping wall 70 of the vacuum belt diverter unit 36 (FIG. 8), and, mounted upon console 262 and disposed in the region of the upper edge thereof, a flap guide bracket 266 with flap guide 246 mounted thereon, a flap diverter 268, a plow bracket 270 with an upper flap plow 272 mounted thereon, a turn-down guide 274, and a zip edge marker or zip break marker 276. Envelope sealing module 38 further comprises, mounted upon console 262, a cantilever bridge 278 having disposed in its upper horizontal cantilevered region a flap moistener arrangement 280, a plurality of freely revolving flap closer rolls 282 of resilient foam material, and an adjustable lower guide bar 284. Further comprised in envelope sealing module 38 is a plurality of driven transport belts 286 of the endless kind disposed in the plane of and longitudinally along sloping surface 264. Not shown here is a plurality of spring-loaded pressure rollers, also comprised in envelope sealing module 38, that are disposed above and along sloping surface 264 so that envelopes transported upon and by transport belts 286 (from left to right) are pressed thereupon to provide adequate frictional engagement. Additionally, envelope sealing module 38 includes an upper guide bar 288 that is disposed along the upper edge of sloping surface 264. Inserted envelope 254 with its flap 255 is indicated in phantom lines as it enters the envelope sealing module 38 from the right side; i.e. being delivered thereto by vacuum belt diverter unit 36 in alignment between upper and lower guide bars 288 and 284.

Flap moistener arrangement 280 includes a shallow pan 290 that holds a thin pad 292 for roughening and moistening of envelope flaps. Pan 290 is fed with pumped water at appropriately low flow rates and it is provided with a drain for return of the liquid to a tank to prevent overflowing and to discharge and thusly exchange fluid to achieve appropriate continuous envelope flap moistening capability. Roughening and moistening pad 292 may be of any one of a variety of wettable and liquid-permeable (coarse felt-like or brush-like) materials to provide for feed of moisture substantially by wicking action therethrough to its upper surface. Further, pad 292 has an appropriately coarse surface texture to achieve a certain degree of roughening and to result in reliable wetting of the adhesive layere on an envelope flap during moistening thereof as an envelope flap slides over the pad. Various conventional materials may be used for such purposes. For example, plastic coarse felts or brushes can be used. A preferred choice is a so-called "scrubber pad", which is coarse felt-like plastic pad material that is commercially available for household and industrial cleaning purposes. Flap moistener arrangement 280 also includes a lower flap plow 294 that protrudes from (and is in smooth continuation of) the upper surface of cantilever bridge 278 toward the right and that is gently downwardly curved with its leading tip disposed below trailing end of flap guide 246. The upper horizontal portion of cantilever bridge 278 (at its end closet to sloping surface 264) clears sloping surface 264 by a distance that is sufficient to allow envelopes filled with inserts to pass therebetween, while the corresponding envelope flap (in the region of its adhesive layer) slides over uppr surface of pad 292, keeping contact therewith and thusly being roughened and moistened thereby.

As hereinbefore described in conjunction with FIG. 8, flap guide 246 protrudes with its leading portion onto vacuum belt transporter/diverter unit 36, wherein it intercepts flap 255 by entering below the at least partially opened flap 255. Thereafter, flap guide 246 keeps guiding flap 255 in the described manner until this flap-guiding function is passed on to lower flap plow 294 or upper flap plow 272, depending on the position of a diverter arm 296 comprised in flap diverter 268. Flap diverter 268 also contains a spring-loaded solenoid actuator for selective positioning of divereter arm 296 to one of two positions, namely into the position shown that guides flap 255 onto lower flap plow 294, or into a retracted position within the housing of flap diverter 268 that permits flap 255 to pass over upper flap plow 272. Turn-down guide 274 is mounted at its upper rear edge and allows clearance between its lowest downward facing surface and sloping surface 264 so that insert-filled envelope 254 may pass therebetween. Turn-down guide 274 is shaped to intercept partially open flap 255 and bend it downwardly toward its closed position so that it enters beneath flap closer rolls 282 substantially in such closed position.

The lower surface of the trailing portion of upper flap plow 272 is shaped and disposed above pad 292 so that a flap of an envelope that passes therebetween is pressed upon pad 292 having its adhesive layer appropriately moistened and roughened thereby in readiness for sealing. Zip break marker 276 is disposed above the upper portion of sloping surface 264 so that it may selectively mark the envelope's upper edge, for example with a mark used to distinguish a particular envelope. Zip break marker 276 is of conventional design as commonly used in mail handling equipment.

In operation, for example envelope 254 is delivered in aligned position to envelope sealing module 38 (from the right side), as shown. With its flap 255 guided by flap guide 246, envelope 254 is transported to have its flap moistened by pad 292, if diverter arm 296 is positioned as shown. Envelope 254 is farther transported and has its now moistened flap bent downwardly by turn-down guide 274, whereupon it enters with its flap turned down into closed position beneath resilient flap closer rolls 282 that press down onto flap 255 to assure sealing thereof. Envelope 254 may be marked by zip break marker 276 as it passes thereby. Envelope 254, now properly sealed, is transported farther (to the left) and delivered to further handling equipment, specifically now to turnover module 40 whose envelope entry is aligned with and disposed immediately adjacently to the delivery or exit end of envelope sealing module 38.

As it is selectively actutable, diverter arm 296 may be selectively retracted into the housing of flap diverter 268. In this case, when diverter arm is withdrawn from the path of envelope flap 255 and does not, therefore, guide flap 255 beneath upper flap plow 272, flap 255 passes over flap plow 272 (well above and out of the way of pad 292) and thereby bypasses the moistening operation. Thereafter, the envelope is handled as hereinabove described (except that is not sealed). Various reasons exist when selective bypassing of sealing is required. For instance, an error may have been sensed in prior stuffing or other operation, or it may simply be a particular job requirement that certain or all envelopes remain unsealed. As computer 50 tracks sequentially and associatively each item handled and any errors sensed, it also provides control for selective diversion, extraction, rejection, marking etc. of specific individual envelopes.

Figure 10:
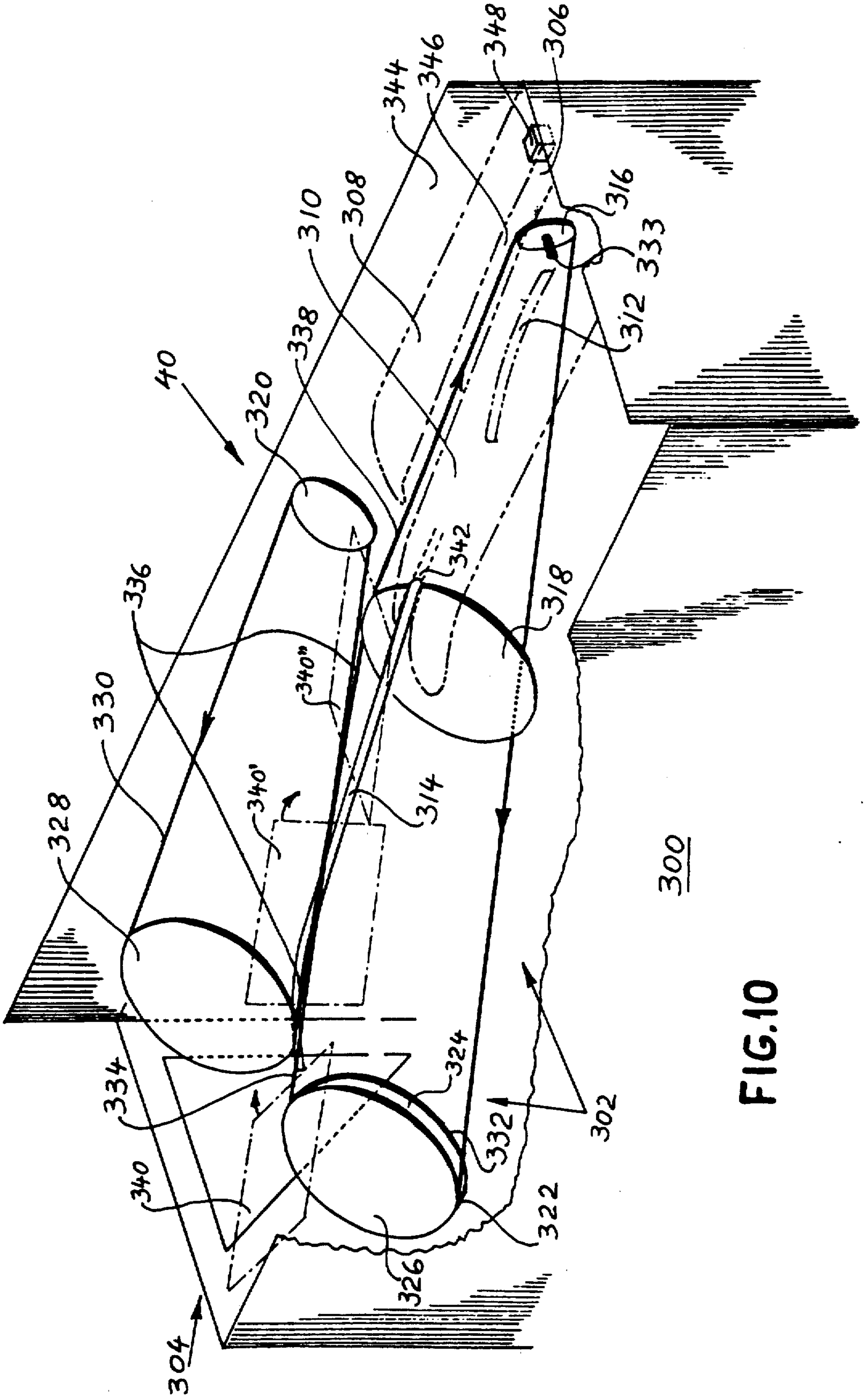
FIG. 10 is a schematic fragmented partial isometric view of a turnover module (indicated in FIG. 1)

Referring now to FIG. 10, turnover module 40 depicted therein comprises a housing structure 300, a driven belt/pulley system 302 mounted therein for turning over of envelopes delivered thereto, a delivery entry 304 for entry of envelopes delivered thereto from envelope sealing module 38, a delivery egress 306 for delivering turned over envelopes in horizontal (face-up) orientation to further equipment, for instance to on-edge stacking/diverter unit 42, a rear platform 308 and a front platform 310 upon which turned over envelopes are conveyed to egress 306, a platform guide 312 for alignment of envelopes conveyed to egress 306, and a turn guide rod 314 to guide envelopes during turnover. Belt/pulley system 302 includes a motor-driven drive pulley 316, a narrow lower trailing turn pulley 318, a narrow upper trailing turn pulley 320, a lower leading double pulley 322 that includes a lead pulley 326 and a further pulley, namely a drive disc 324 being in driving connection therewith (both having substantially the same diameter and being disposed coaxially and in parallel being spaced apart by a small distance), a narrow upper lead pulley 328, and endless elastic resilient turn belt 330 having relatively high frictional properties and having a round cross-section, and an endless elastic resilient disc belt 332 having also a round cross-section and relatively high frictional properties and being securely mounted in an appropriate groove about the entire periphery of drive disc 324. All pulleys are appropriately peripherally-grooved pulleys and are freely rotatably borne on axles that are mounted in housing structure 300, except that drive pulley 316 is borne upon a horizontal motor-driven drive axle 333 and is driven in a clockwise direction of rotation.

Pulleys 318, 320, 322, and 328 are disposed in an orientation that is substantially normal to the plane of envelopes delivered to turnover module 40, this plane being substantially coplanar with sloping surface 264 of envelope sealing module 38 (FIG. 9). Turn belt 330 is mounted in belt/pulley system 302 in the manner of a figure '8', being continuously driven (in the direction shown by arrows) by drive pulley 316 and connecting from the lower periphery thereof to the lower periphery of lead pulley 326 (and partially therearound), connecting from the upper periphery of lead pulley 326 to the lower periphery of upper trailing turn pulley 320 (and partially therearound) and further connecting to the upper periphery of upper lead pulley 328 (and partially therearound). Further, turn belt 330 continues from the lower periphery of upper lead pulley 328 and connects therefrom, via the upper periphery of lower trailing turn pulley 318, to the upper periphery of drive pulley 316 (and partially therearound).

For clarity's sake of this description, the following auxiliary designations are made for portions of turn belt 330:

The portion between the upper periphery of lead pulley 326 and the lower periphery of upper trailing turn pulley 320 shall be designated as a front reach 334;

the portion between the lower periphery of upper lead pulley 328 and the upper periphery of lower trailing turn pulley 318 shall be designated as a rear reach 336; and the portion between the upper periphery of lower trailing turn pulley 318 and the upper periphery of drive pulley 316 shall be designated as an egress reach 338.

Relative locations of lead pulley 326, upper lead pulley 328, lower trailing turn pulley 318, and upper trailing turn pulley 320 are such that front reach 334 and rear reach 336 of turn belt 330 are disposed in close, but varying proximity to one another in a manner of being to some small degree twisted about one another (anticlockwise when viewed from delivery entry 304) along a large part of their lengths. Thusly, front reach 334 of turn belt 330 resiliently crosses over and contacts rear reach 336 of turn belt 330 under substantial mutual contact pressure. Lead pulley 326 (together with drive disc 324 and the disc belt 332 surrounding it) is disposed in a location such that the upper surface of front reach 334, where it rides in the groove of the upper periphery of lead pulley 326, is substantially in tangential alignment with the lower surface of an envelope (in the proximity of the longitudinal centerline thereof) being delivered at entry 304 to turnover module 40. For example, this is indicated by an envelope 340 (depicted by phantom lines) just entering turnover module 40 and making initial contact at its leading edge with front reach 334. Drive disc 324 (with its belt 332) assists during initial capture of an envelope to prevent occurence of a premature tilting (or sliding) thereof prior to its secure engagement in the nip between reaches 334 and 336. Transport motion of delivery of envelope 340 to turnover module 40 results in the envelope 340 being nipped between reaches 334 and 336 and securely transported thereby toward the right.

Turn guide rod 314 is mounted within housing structure 300. It is disposed below reaches 334 and 336 and is curved so that its leading portion gradually intercepts and slides along the (initially) upper surface of envelope 340 (in the envelope's region below its middle) as it is being transported farther by and between reaches 334 and 336. Envelope 340' (shown in phantom lines) is representative of the position and orientation which the farther-transported envelope 340 attains at the time when it is intercepted and guided by guide rod 314. Arrows upon envelopes 340 and 340' indicate the turning motion caused by cooperative action of the twist between reaches 334 and 336 and the curved guide rod 314. Continued transport of envelope 340' in the nip between reaches 334 and 336 causes continued turning of the envelope to the face-up orientation and position indicated by envelope 340" (shown by phantom lines) while envelope 340" continues being guided upon and slid along curved turn guide rod 314.

Turn guide rod 314 terminates adjoinedly in and may be attached to a slot/valley 342 of an upwardly ramped leading portion of front platform 310. In this region, turn guide rod 314 and front platform 310 are disposed above a larger portion of lower trailing pulley 318. The upper surface of turn guide rod 314 is substantially level with the surface of front platform 310 in the adjoined region such as to provide a smooth transition therebetween for envelope 340". Front platform 310 is mounted in housing structure 300 and has curved platform guide 312 adjustably mounted upon its upper surface. Also mounted in housing structure 300 is rear platform 308 having its rear edge disposed along housing wall 344 and having a gradually upwardly curved leading ramp similar to the leading ramp of front platform 310. For clarity's sake, particularly of the depiction of the entire belt/pulley system 302, platforms 308 and 310 are shown here in phantom lines. Platforms 308 and 310 are disposed substantially horizontally in a common plane and are spaced apart by a gap 346 to clear egress reach 338. Egress reach 338 is disposed substantially in the plane of platforms 308 and 310 having its upper belt surface reach slightly above the surfaces thereof to provide frictional conveying engagement with envelopes conveyed thereupon to delivery egress 306. Here not shown is a plurality of conventional pressure brushes or rollers that are diposed above platforms 308 and 310 and egress reach 338 to provide downward force upon envelopes onto egress reach 338 to facilitate transport of envelopes thereupon. A photosensor 348 is disposed in platform 308 for sensing of envelopes thereupon to provide control and tracking information to computer 50 and to auxilliary control systems, particularly also for control and supervision of subsequent equipment.

In the course of continued transport, envelope 340" is released from the nip between reaches 334 and 336 and is farther conveyed upon platforms 308 and 310 by egress reach 338 (being pressed thereupon by pressure brushes or rollers) toward delivery egress 306. The transport path of an envelope from delivery entry 304 to delivery egress 306 is tilted upwardly and toward the rear housing wall 344, while the envelope is transported between reaches 334 and 336, and almost horizontally and only slightly directed toward rear housing wall 344 thereafter. An envelope that has reached platforms 308 and 310 is urged thusly to alignment along housing wall 344 by its transport action in addition to being urged thereto and aligned therealong by the curved shape of platform guide 312. Consequently, an envelope aligns itself appropriately by slight slipping upon platforms 308 and 310 and egress reach (transversely to its direction of transport) and is delivered to delivery egress 306 and farther to subsequent equipment in a specific accurate alignment. Platform guide 312 is adjustable for adaption to different size envelopes.

In brief recapitulation of the operation of turnover module 40, an envelope delivered thereto in substantially tilted orientation, having its flap-side facing generally upwardly and rearwardly, is captured by crossing and mutally contacting reaches 334 and 336 (that are twisted about one another) of driven turn belt 330 in the nip therebetween, is transported and turned over thereby, being aided in turnover by turn guide rod 314, and is conveyed in substantially horizontal orientation (flap-side down) in aligned manner to delivery egress 306 and thereby to subsequent envelope handling equipment, for example on-edge stacking/diverter unit 42.

Referring to FIGS. 11 to 15, on-edge stacking/diverter unit 42 depicted therein comprises a diverter section 350 to selectively pass on or divert envelopes, a stacker section 352 for stacking of diverted envelopes including a stacking spider 353, and accumulator 44 for accumulating stacked envelopes.

Figure 11:
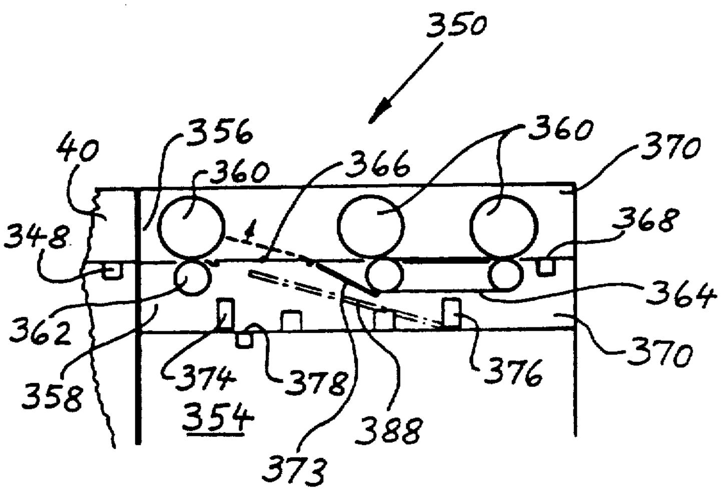
FIG. 11 is a schematic partial fragmented front view and section of a diverter portion of an on-edge stacking unit indicated in FIG. 1.
Figure 12:
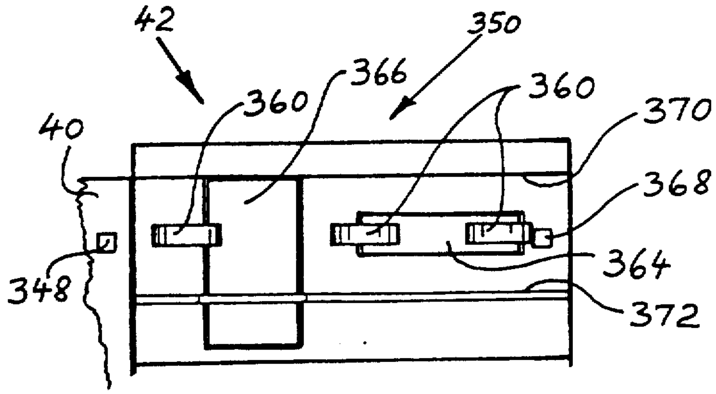
FIG. 12 is a schematic partial fragmented top view of the diverter portion shown in FIG. 10.

Particularly referring now to FIGS. 11 and 12, diverter section 350 comprises a base structure 354 (that is common also with stacker section 352), an upper level 356 for receiving, diverting, and passing on of envelopes delivered thereto, and a lower level 358 to which envelopes are diverted for stacking. Further indicated in FIGS. 11, 12, and 14 is equipment that delivers envelopes to on-edge stacking/diverter unit 42, for instance turnover module 40 including photosensor 348.

Upper level 356 comprises a plurality of conventional pressure rollers 360 that provide pressure onto envelopes against a drive roll 362 and a drive belt 364 which thusly convey envelopes upon upper level 356 (to right). Further comprised in the floor of upper level 356 is a selectively openable hinged divert gate 366 that is shown in its closed position flush with the floor of upper level 356 and that is indicated in its open position by dashed lines. Additionally, the floor of upper level 356 comprises a photosensor 368 for sensing of envelopes leaving toward the right side to subsequent envelope handling equipment, a rear wall 370 and an adjustable aligner 372, the latter two serving for alignment of envelopes therebetween, being adjustable to different envelope widths. Aligner 372 is provided with a partial cutout above divert gate 366 to permit opening thereof. Above the floor of lower level 358 (in the vicinity of the hinge of divert gate 366) is disposed a guide strip 373 to guide downwardly diverted envelopes onto the floor. Guide strip 373 is, for example, of Teflon or other low-friction material to promote downwardly sliding deflection of envelopes along its lower surface.

Lower level 358 comprises selectably operable adjustable length-stops 374 and 376 that are ganged together for common positional shifts along rear wall 370 to provide selectable envelope offset in stacking. Additionally, lower level 358 comprises an adjustable aligner 372' that is ganged with aligner 372. Aligner 372' is spaced from the floor of lower level 358 to form an opening adequate to clear envelopes propelled therethrough. Further comprised in and below the floor of lower level 358 is a photosensor 378 for detection of envelopes diverted thereupon, a pair of rotatable paddles 380 mounted upon a common shaft borne beneath floor of lower level 358, and an upper and a lower pair of rotating nip rolls 382 and 384, respectively, each pair being borne upon a separate shaft and one of said pairs being motor-driven so that an envelope captured in the nip is transported toward stacking spider 353.

Figure 13:
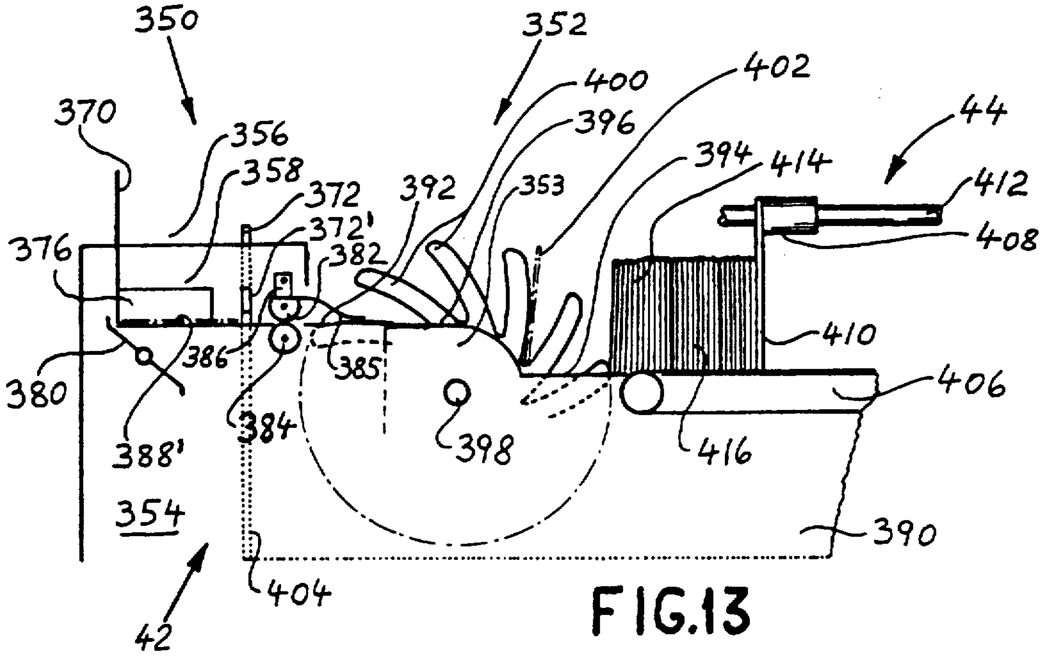
FIG. 13 is a schematic partial fragmented side view and section of an on-edge stacking unit indicated in FIG. 1 and also partially shown in FIGS. 11 and 12.
Figure 14:
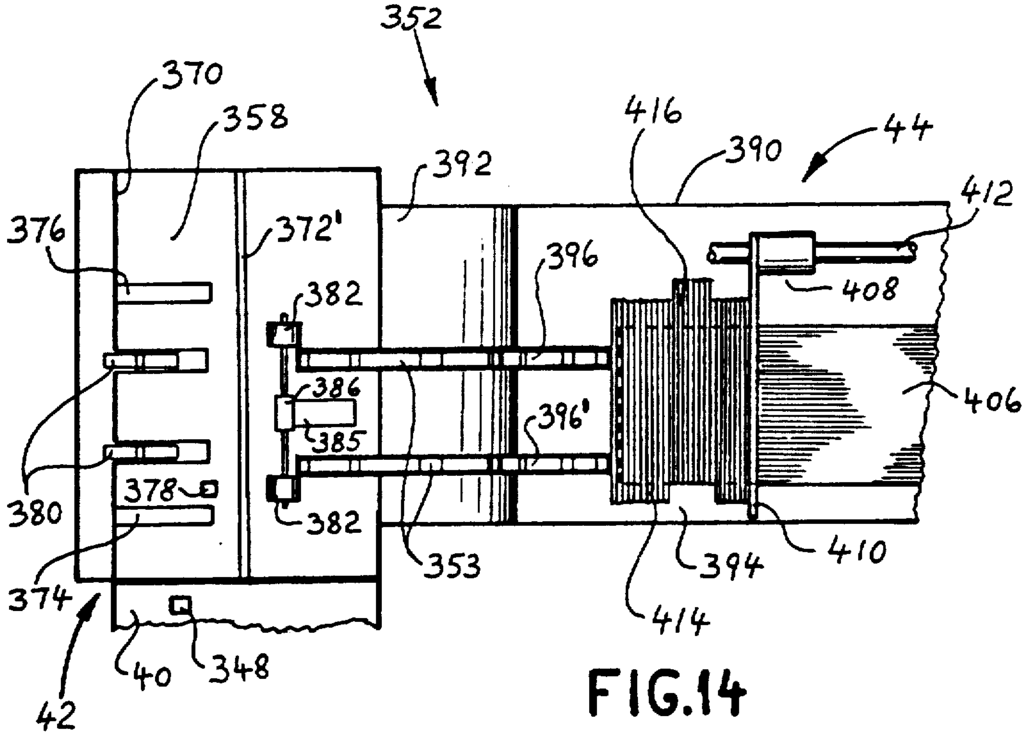
FIG. 14 is a schematic partial fragmented top view (with an upper portion removed) of the on edge-stacking unit shown in FIG. 13.

A curved arm 385 of resilient flat-spring-like material is freely pivotably disposed in the envelope path between nip rolls 382, 384 and stacking spider 353, as indicated in FIGS. 13 and 14, so that an envelope that is propelled along this path is restrained from bouncing (and misaligning) once it has left the nip of the rolls. Arm 385 is secured to a pivotable mount 386 that is in turn appropriately mounted within the structure of the lower level 358 of diverter section 350. Arm 385 is held in the position shown by its weight and allows an envelope to pass slidingly thereunder on its way to stacking spider 353.

Paddles 380 are selectively commonly rotatable in increments of 180 degrees with respect to the position shown in FIG. 13 by a motor via a conventional solenoid-actuatable one-half revolution clutch in response to appropriate control signals. When rotated, ends of paddles 380 protrude and move through appropriate clearance slots in floor of lower level 358 so that their motion propels an envelope disposed thereupon into the nip between nip rolls 382 and 384. For instance, an envelope 388 (shown in phantom lines in FIG. 11) is falling from upper level 356 to lower level 358, having been diverted by divert gate 366. This envelope is indicated then as envelope 388' (in FIG. 13) subsequent to its diversion and resting now upon the floor of lower level 358. A subsequent selective operation of paddles 380 (in clockwise rotation) propels envelope 388' as hereinabove described.

Referring now particularly to FIGS. 13 and 14, stacker section 352 comprises a horizontally slidably adjustable table 390 that is partially borne in and upon base structure 354 (common also to stacker section 352) in a telescoping manner, and stacking spider 353 which is borne in table 390 and which is motor-driven via a selectively energizable clutch in clockwise direction and that includes a timing disc revolving commonly therewith and a photosensor sensing the position of this timing disc (not shown here). As will be described hereinafter in more detail, stacking spider 353 is borne in table 390 in a floating manner, being free to move for a short distance in a substantially horizontal plane away from accumulator 44. Stacking spider 353 is spring-loaded toward accumulator 44. Table 390 includes an upper surface 392 and a stacking surface 394. Upper surface 392 is disposed at substantially the same level as or slightly lower than the surface of the floor of lower level 358 in the adjoining region thereof. Stacking surface 394 is disposed at a lower level than upper surface 392 and adjoins a downwardly curved extension thereof.

Stacking spider 353 further comprises a pair of parallel spider wheels 396 and 396' commonly mounted and driven by a shaft 398. Spider wheel 396 and 396' are identical in shape, having disposed about their peripheries a plurality of equally spaced identical spider legs 400 of generally sawtooth-like shape in a trailing orientation in reference to their normal clockwise direction of rotation. Spaces between spider legs 400 are such that a stuffed envelope may easily be disposed therein, as indicated for example by envelope 402 (depicted in phantom lines in FIG. 13). Spacing between spider wheels 396 and 396' is somewhat less than the length of the shortest envelope that is required to be handled by this equipment. Slidable adjustment of table 390 is provided for adaptation of this equipment to different size envelopes, in particular to different widths and it is, therefore, ganged to the adjustment of aligners 372 and 372', as schematically indicated by dotted lines as gang connection 404 (FIG. 13).

Accumulator 44 is substantially a conventional stack accumulator device that is used to accumulate flat articles, such as documents, envelopes, and similar articles side-on-side in vertical orientation into stacks. Accumulator 44 is borne on table 390 and comprises a powered conveyor belt arrangement 406 having its upper surface disposed slightly above stacking surface 394, and a back plate arrangement 408 that includes a back plate 410 slideably and hingeably borne on a rod 412. Rod 412 is mounted upon table 390 in conventional manner (not shown here). Back plate 410 rests upon the conveyor belt of the conveyor belt arrangement 406 and moves therewith along shaft 408 as an envelope stack 414 accumulates and grows in thickness. Back plate 410 may be hinged upwardly about rod 412 for removal of stack 414 or a portion thereof. Powered conveyor belt arrangement 406 facilitates orderly accumulation of a stack by incrementally moving on-edge stacked envelopes in unison in response to increasing stack thickness detected by a photosensor. This photosensor detects horizontal movement of stacking spider 353 due to increasing stack thickness, as will be described in detail hereinafter.

When only short stacks of envelopes are to be handled and stacked in accumulator 44, conveyor belt arrangement 406 need not be powered, but may be free-running. In this case, sensing of stack accumulation by the aforementioned photosensor is not needed and stacking spider 353 need not be arranged in the indicated floating manner.

Envelope stack 414 has an offset portion 416 disposed therein to illustrate the result of the hereinabove mentioned selectable envelope offset capability comprised in lower level 358 of the diverter section 350. For instance, to distinguish a particular set of diverted envelopes, for example by specific zip codes, because of particular contents, or for any other reason, the indicated offset capability is provided so that offset portion 414 may be recognized and selectively handled subsequent to its accumulation in accumulator 44.

Figure 15:
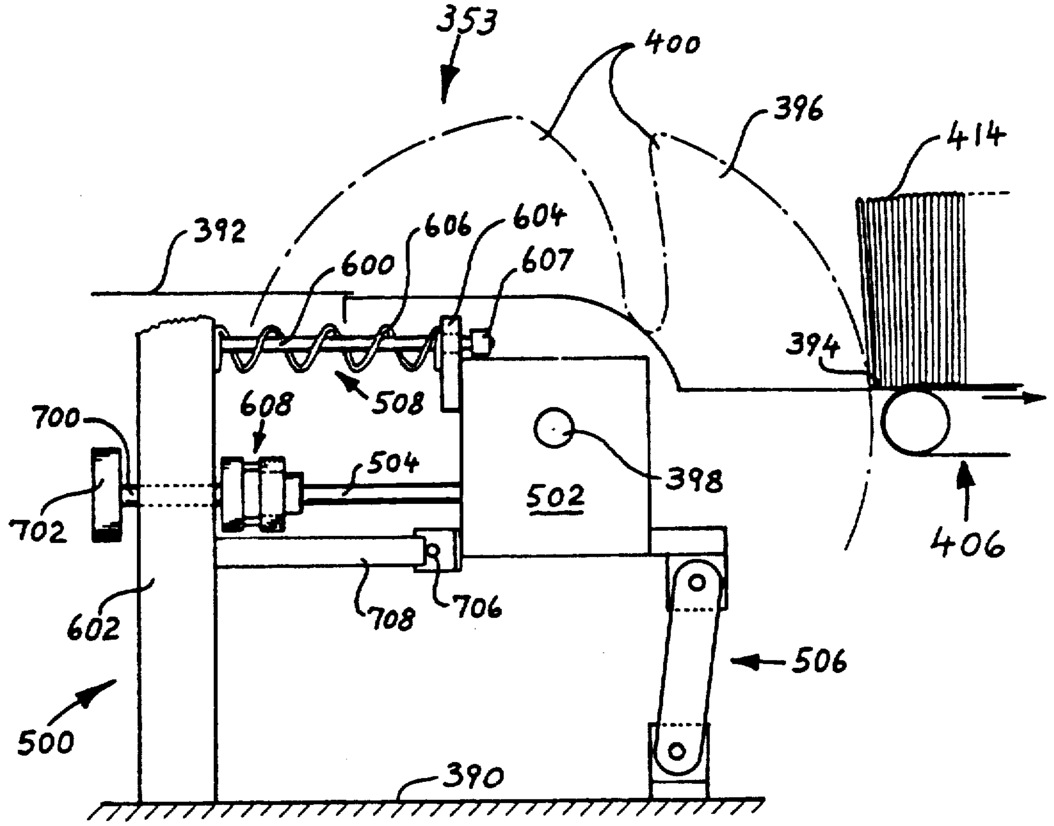
FIG. 15 is a schematic partial enlargement of a middle portion of the view given in FIG. 13 (showing additional details obscured and not shown in FIG. 13).

Referring now particularly to FIG. 15, the hereinbefore mentioned floating manner in which stacking spider 353 is borne in table 390 is provided by a floating drive suspension arrangement 500. FIG. 15 shows floating drive suspension arrangement 500 (that has been omitted from FIG. 13 for clarity's sake) in a partial schematic enlargement of a middle portion of FIG. 13. As indicated in phantom lines, spider wheels 396 (of stacking spider 353), including indicated spider legs 400, are borne upon and revolved by shaft 398. As hereinbefore described in detail (in conjuction with FIGS. 13 and 14), spider wheels 396 transport envelopes, fed thereto substantially along and upon upper surface 392 in horizontal orientation, to stacking surface 394 for side-on-side stacking in substantially vertical orientation. Floating drive suspension arrangement 500 serves to drive and suspend shaft 398 so that stacking spider 353 is free to move for a short distance in a substantially horizontal direction toward the left and away from stacking surface 394 (and thusly from accumulator 44-FIG. 13) toward which it is spring-loaded.

Floating drive suspension arrangement 500 comprises a worm reducer gearbox 502, having shaft 398 as its output shaft, and being driven by an input shaft 504. Worm reducer gearbox 502 is supported via a rocker arm means 506 whose one end is securely mounted within table 390. Additionally, worm reducer gearbox 502 is supported in spring-loaded manner by a spring loading means 508, comprising a guide rod 600 that is secured, at one end thereof, to a post 602. Post 602 is rigidly secured within table 390. The free end of guide rod 600 extends through a clearance hole in a bracket 604 which is rigidly attached to or is a part of the housing of worm reducer gearbox 502. A compression spring 606 is threaded over guide rod 600 and, in pre-compressed manner, extends between post 602 and bracket 604 and thusly forces gearbox 502 toward the right. A mechanical stop in form of a stop collar 607 limits the distance of possible travel of gearbox 503 toward the right. Stop collar 607 is secured to the free end of guide rod 600 and contacts bracket 604 at the limit of floating travel of gearbox 502 (toward the right).

Input shaft 504 is coupled via a pin coupling 608 to drive axle 700. Drive axle 700 extends through and is borne by post 604 in an appropriate bearing therein. A drive pulley 702, that is attached to the end of drive axle 700, is driven via a belt (not shown here) by a powered drive mechanism (for stacking spider 353). Pin coupling 608 couples the rotation of drive axle 700 to input shaft 504, while permitting axial displacement (as well as a small amount of angular misalignment) therebetween.

It will be understood that rocker arm means 506 comprises at least two parallel rocker arms or a unitary rocker arm having adequate bearing lengths (perpendicular to the plane of the depiction in FIG. 15) and rigidity to provide such support for gearbox 502 as to avoid any substantial angular and axial displacement of its shaft 398; in other words, to substantially avoid skewing and rocking motions of spider wheels 396.

With reference to FIGS. 11 through 15, in operation of on-edge stacking/diverter unit 42, envelopes are serially delivered thereto (for instance by turnover module 40) in horizontal orientation and alignment substantially along rear wall 370 upon the floor of upper level 356 (from left side in FIGS. 11 and 12). If divert gate 366 is in its closed position, as shown, envelopes are conveyed toward the right for delivery to further equipment. If divert gate 366 has been opened, for instance by a solenoid, an envelope is diverted to lower level 358, as indicated by envelope 388. Guide strip 373 aids in the proper diversion and deflection of envelope 388 onto the floor of lower level 358. Envelope 398 thusly falls upon floor of lower level 358, as indicated by envelope 388' in FIG. 13, in the region between length-stops 374 and 376 and between rear wall 370 and aligner 372'.

Subsequently actuated clockwise rotation of paddles 380 propels envelope 388' toward and into the nip between nip rolls 382 and 384 and, thereby, into a space between spider legs 400 of rotating spider wheels 396 and 396'. An envelope propelled by nip rolls 382, 384 into a space between spider legs 400 is restrained from bouncing by the weight and inertia of arm 385, as the envelope has to pass therebelow. Once an envelope has settled in spider wheels 396 and is carried initially upwardly thereby, arm 385 pivot upwardly, being lifted by the envelope disposed thereunder, slides along and out of the way of the envelope, and thereafter pivots back downwardly (by gravity). Moreover, the action of arm 385 ensures that an envelope does not bounce or otherwise move out from its proper location between spider legs 400, whilst being initially lifted and rotated by spider wheels 396.

Appropriate timing of actuation of the rotation of paddles 380 to assure that an envelope is propelled only into a space between legs 400 is obtained by the action of the timing disc and photosensor arrangement of stacking spider 353, as hereinbefore indicated. Energization of the clutch to paddles 380 is inhibited at such times when the propulsion of an envelope by paddles 380 would cause the envelope to impinge upon a spider leg 400. Thusly envelopes are propelled only into spaces between legs 400 (one envelope per space).

Clockwise rotation of spider wheels 396 and 396' carries inserted envelopes to stacking surface 394 and deposits them on-edge thereupon, as indicated by envelope 402. Additionally, trailing edges and tips of spider legs continue to push deposited envelopes side-on-side onto the accumulating envelope stack 414. It can be visualized that stack 414 accumulates in a lateral alignment which is predetermined by the lateral location of length-stops 374 and 376. Selectively operable common relocation of length-stops to different pre-established offset locations thusly causes lateral envelope offset in stack 414, as for example indicated by offset portion 416 in stack 414.

Referring now also particularly to FIG. 15, in response to increasing stack pressure exerted by an accumulating envelope stack 414 back onto spider legs 400, spider wheels 396 move back resiliently (to the left) against the spring loading of its floating drive suspension arrangement 500, allowing stack 414 to increase in thickness toward the left (the last-stacked envelope contacts the adjacent tips of spider legs 400). Consequently, a photosensor 706, that is secured to the floating body of worm reducer gearbox 502 and that has a viewing direction transverse to the floating motion of floating drive suspension arrangement 500, is obstructed by and thusly detects a stationary flag 708 that is rigidly mounted upon post 602. The drive of conveyor belt arrangement 406 is energized in response to this detection by photosensor 706 and moves the accumulated envelope stack 414 toward the right. This movement and the consequent relief of stack pressure allows floating drive suspension arrangement 500 to move spider wheels 396 toward the right (in contact with stack 414) until flag 708 is no longer seen by photosensor 706, whereupon the drive of conveyor belt arrangement 406 is deenergized. As a result, stack and accumulating pressure is maintained within appropriate limits and orderly stacking is assured, regardless of the thickness of an accumulating stack.

It should be understood that, when equipment is specifically intended for accumulating relatively short stacks, the floating drive suspension arrangement 500 (including photosensor 706) may be omitted and the conveyor belt arrangement 406 may then remain unpowered and free-running, such that its belts move directly in response to increasing stack pressure. However, such a simplified stacking accumlator arrangement, which may then also comprise only a rigid drive suspension for spider wheels 396, is strictly limited to handling of relatively short envelope stacks.

In general, various photosensors indicated hereinbefore provide signals for tracking of handled envelopes and for interdependent control of various actuations under supervision of main computer 50 and subsidiary controls and microprocessors throughout the in-line rotary inserter device of the present invention. These sensors particularly also facilitate asynchronous operation in further handling of envelopes that have had inserts inserted therein. Whereas synchronous operation may be utilized, the asynchronous handling capability is preferred as it offers important advantages which will be understood in view of the foregoing descriptions. It will be also understood that transporting of inserts and the therewith associated transporting of envelopes to inserting station 32 is a substantially synchronous operation to the extent that appropriate timing of arrival of mutually associated envelopes and inserts at inserting station 32 is essential.

Referring now again to FIG. 1, main computer 50 is interconnected with subsystems and subunits, also including power supplies, drive motors, pumps and blowers, sensors, detectors, actuators, display stations (for example display/control console 52), control stations, and other electrically operated and electrical signal-generating components either directly or via subsidiary or intermediate control and supervisory units, that may include individual microprocessors, to automatically control and supervise the operation of the in-line rotary inserter device of this invention in preprogrammed manner. For example, sensing of operational malfunctions, damaged, defective or misaligned items, and consequent diversion and rejection thereof, as well as compensation therefor in subsequent operation, is automatically handled by main computer 50 in preprogrammed manner as it tracks inserts and envelopes individually sequentially and associatively with their associated complementary counterparts.

Furthermore, main computer 50 provides auxiliary system control functions, such as, for instance, automatic start-up (and shut-down) sequencing of power and particularly motor power supplies for reducing power surges and consumption (and noise), selective powering-up of a plurality of pumps for air, vacuum, and water in appropriate sections in accordance with particular momentary demand, automatic cycling of pumps, selective shut-down of motors consequent to timed inactivities, selective stoppage or automatic shut-down of power upon malfunctioning of equipment portions, and for similar purposes. Individual malfunction display and reset control stations for individual inserter modules and other subsystems are located in the proximity of corresponding units and are interconnected with main computer 50. Whereas central overriding control of the computer (and therewith of the operation of the entire system) is provided through display/control console 52, these individual malfunction display and reset stations are provided, under pre-programmed computer supervision in appropriately interlocked manner, for local operator convenience, to localize malfunctions, and to direct and assure local attention by operators in case of malfunctions.

In brief recapitulation of the general overall operation of the above described in-line rotary inserter according to principles of the present invention, the inserter feeds inserts from a plurality of inserter modules onto a moving pin conveyor, whereupon one or more such inserts are consequently accumulated in insert stacks that are conveyed to an envelope inserting station. Envelopes are fed thereto from an envelope feed station (from a hopper therein) and are inserted with inserts in the inserting station. Therefrom, envelopes are transported via a vacuum belt transporter/diverter unit to an envelope sealing module wherein they are sealed, and farther via an envelope turnover module to an on-edge stacking/diverter unit including an envelope accumulator.

It should be noted that the above described in-line rotary inserter exhibits many significant and decisive advantages over previous inserters. For instance, continuous automatic operation under computer control and supervision provides for smooth uninterrupted operation at significantly higher throughput rates and with fewer and shorter down-times than hitherto possible. Automatic sensing, rejection, and diversion of faulty, misaligned, or damaged envelopes and inserts without need for equipment shut-down and compensation therefor is facilitated by automatic computer tracking of individual processed items, which further improves throughput rate capabilities. Higher alignment accuracies throughout the device and improved reliability of every unit reduces occurences of fault conditions. Increased reliable speed capabilities of subsystems over maximum speed capabilities that have been exhibited by prior equipment performing similar functions heretofore is achieved by numerous mechanical and electrical improvements as described in detail hereinbefore.

While the invention has been particularly shown and described with reference to preferred embodiments thereof, it will be understood by those skilled in the art that various changes and modifications in form and details may be made therein without departing from the spirit and scope of the invention.

The embodiments of the invention in which an exclusive property or privilege is claimed are defined as follows:

1. A turnover module for turning over envelopes, the turnover module having an entry and an egress, envelopes being received by the turnover module at said entry in a first orientation and delivered from the turnover module at said egress in a second orientation, the turnover module comprising a belt/pulley system including:

- a plurality of pulleys, at least one of said pulleys being driven, said plurality of pulleys including leading pulleys disposed proximally to said entry;
- a driven endless belt disposed about said plurality of pulleys in resiliently tensioned manner substantially in shape of a flattened FIG. '8' having a crossover region, said endless belt including in said crossover region a first reach and a second reach, said reaches resiliently contacting one another along length portions thereof while crossing over and twisting about one another; and,
- means for preventing premature tilting of an envelope prior to and at the beginning of the envelope being securely nipped between said reaches, said means for preventing including a disc parallel to and of the same diameter as and commonly coaxially revolving with one of said leading pulleys, said disc having an endless belt encircling its periphery;
- wherein envelopes are received in the region of said entry at one end of said reaches, are nipped between said reaches, are transported along and through said crossover region while being turned over, and are delivered from the other end of said reaches in the direction of said egress.

2. The turnover module according to claim 1, wherein said driven endless belt has a round cross-section.

3. The turnover module according to claim 1, further including means for guiding an envelope during turnover while the envelope is being transported through said crossover region.

4. The turnover module of claim 3, wherein said means for guiding includes a turn-guide rod that is disposed below said reaches and that is curved so that the leading portion of said turn guide-rod gradually intercepts and guides an envelope during turnover.

5. The turnover module according to claim 1, further including a platform and a wall in the approach region to said egress, envelopes being conveyed by said driven endless belt upon said platform and along said wall toward said egress, said platform having a guide rail disposed thereon for guiding envelopes toward and into alignment with said wall.

6. The turnover module according to claim 1, said leading pulleys being disposed in a common plane vicinally to said entry, wherein the first orientation in which envelopes are received in a region between said leading pulleys is substantially orthogonal to said common plane.

7. The turnover module of claim 6, further including a platform in the approach region to said egress, wherein envelopes are delivered to said egress upon said platform in the second orientation.

8. The turnover module of claim 7, wherein the angle between the first orientation and the second orientation is between ninety and one hundred and eighty degrees.

9. The turnover module of claim 7, wherein the angle between said common plane and said platform is less than ninety degrees.

10. The turnover module of claim 7, wherein said platform is oriented substantially horizontally.

11. A method of turning over envelopes in a turnover module, the method comprising steps of:

- receiving envelopes at an entry to said turnover module in a first orientation;
- nipping envelopes in a nip between reaches of a resiliently-tensioned driven endless belt that is disposed about a plurality of pulleys substantially in the shape of a flattened FIG. '8' and that has a crossover region, said reaches contacting one another along length portions thereof while crossing over and twisting about one another in the region of said crossover region, said plurality of pulleys including a leading pulley disposed proximally to said entry;
- preventing premature tilting of envelopes prior to and at the beginning of envelopes being securely nipped during the step of nipping, said turnover module including a disc parallel to and of the same diameter as and commonly coaxially revolving with said leading pulley, wherein the step of preventing includes a step of supporting envelopes upon said disc;
- transporting envelopes nipped between said two reaches therealong from the region of said entry toward an egress of said turnover module;
- turning envelopes during the step of transporting by virtue of mutual crossover and twist of said reaches;
- delivering envelopes from said nip toward said egress in a second orientation.

12. The method according to claim 11, further including the step of assisting envelopes during the step of turning while said envelopes are transported through said crossover region.

13. The method of claim 12, wherein the step of assisting includes sliding envelopes along a turn-guide rod that is disposed below said reaches and that is curved so that a leading portion thereof gradually intercepts and guides said envelopes.

14. The method according to claim 11, further including the steps of:

conveying envelopes upon a platform in the approach region to said egress by said resiliently tensioned driven endless belt;

guiding envelopes upon said platform by a guide rail toward a wall that is disposed along a rear portion of said platform, said guide rail being disposed along a front portion of said platform; and, aligning envelopes upon said platform against and along said wall.

15. The method according to claim 11, wherein said step of turning is effected through an angle that is between ninety and one hundred and eighty degrees.

* * * * *